(12) United States Patent
Jang et al.

(10) Patent No.: US 12,212,850 B2
(45) Date of Patent: Jan. 28, 2025

(54) SENSOR SHIFTING ACTUATOR

(71) Applicant: SAMSUNG ELECTRO-MECHANICS CO., LTD., Suwon-si (KR)

(72) Inventors: Su Bong Jang, Suwon-si (KR); Sang Jong Lee, Suwon-si (KR); Hee Soo Yoon, Suwon-si (KR); Seung Jae Song, Suwon-si (KR)

(73) Assignee: Samsung Electro-Mechanics Co., Ltd., Suwon-si (KR)

(*) Notice: Subject to any disclaimer, the term of this patent is extended or adjusted under 35 U.S.C. 154(b) by 290 days.

(21) Appl. No.: 17/983,470

(22) Filed: Nov. 9, 2022

(65) Prior Publication Data
US 2023/0209197 A1 Jun. 29, 2023

(30) Foreign Application Priority Data
Dec. 23, 2021 (KR) .................. 10-2021-0185825

(51) Int. Cl.
*H04N 23/68* (2023.01)
*G02B 7/08* (2021.01)
(Continued)

(52) U.S. Cl.
CPC ............. *H04N 23/687* (2023.01); *G02B 7/08* (2013.01); *H02K 41/0356* (2013.01); *H04N 23/54* (2023.01); *H04N 23/57* (2023.01)

(58) Field of Classification Search
CPC ...... H04N 23/687; H04N 23/54; H04N 23/57; H04N 23/45; G02B 7/08; H02K 41/0356; H02K 41/031; H02K 33/18
See application file for complete search history.

(56) References Cited

U.S. PATENT DOCUMENTS 12,058,443 B2 * 8/2024 Lee .................. G03B 5/00
2006/0269262 A1 11/2006 Shin et al.
(Continued)

FOREIGN PATENT DOCUMENTS

JP 2010-152182 A 7/2010
JP 2018-77223 A 5/2018
(Continued)

OTHER PUBLICATIONS

Korean Office Action issued on May 9, 2023, in counterpart Korean Patent Application No. 10-2021-0185825 (8 pages in English, 5 pages in Korean).

*Primary Examiner* — Mekonnen D Dagnew
(74) *Attorney, Agent, or Firm* — NSIP Law

(57) ABSTRACT

A sensor shifting actuator is provided. The sensor shifting actuator include a first movable body in which an image sensor having an imaging surface is disposed, a fixed body in which the first movable body is disposed to be movable in first and second directions parallel to the imaging surface, a driving unit configured to provide a driving force to the first movable body, and a position sensing unit configured to sense a position of the first movable body and including a sensing coil disposed on any one of the first movable body and the fixed body and a sensing yoke unit disposed on the other thereof, wherein the sensing yoke unit includes a plurality of sensing yokes spaced apart from each other in a direction orthogonal to the imaging surface, and each sensing yoke is configured to change in width in a moving direction of the first movable body.

19 Claims, 21 Drawing Sheets

(51) Int. Cl.
    *H02K 41/035*     (2006.01)
    *H04N 23/54*     (2023.01)
    *H04N 23/57*     (2023.01)

(56) References Cited

U.S. PATENT DOCUMENTS

| | | | |
|---|---|---|---|
| 2018/0128649 A1 | 5/2018 | Terajima | |
| 2020/0052621 A1 | 2/2020 | Yu et al. | |
| 2020/0272027 A1 | 8/2020 | Kim et al. | |
| 2020/0400464 A1* | 12/2020 | Yedid | H04N 23/69 |
| 2022/0337753 A1* | 10/2022 | Oh | H04N 23/687 |
| 2022/0390707 A1* | 12/2022 | Park | G03B 3/10 |

FOREIGN PATENT DOCUMENTS

| | | |
|---|---|---|
| KR | 10-2006-0122237 A | 11/2006 |
| KR | 10-2020-0018895 A | 2/2020 |
| KR | 10-2020-0102236 A | 8/2020 |
| KR | 10-2021-0026659 A | 3/2021 |

* cited by examiner

SENSOR SHIFTING ACTUATOR

CROSS-REFERENCE TO RELATED APPLICATIONS

This application claims the benefit under 35 USC § 119(a) of Korean Patent Application No. 10-2021-0185825 filed on Dec. 23, 2021, in the Korean Intellectual Property Office, the entire disclosure of which is incorporated herein by reference for all purposes.

BACKGROUND

1. Field

The following description relates to a sensor shifting actuator.

2. Description of Related Art

Recently, camera modules have been implemented in mobile communication terminals such as, but not limited to, smartphones, tablet personal computers (PCs), and notebook computers.

Additionally, camera modules are provided with an actuator or actuators which have a focus adjustment operation and a shake correction operation in order to generate high-resolution images.

For example, the focus may be adjusted by moving a lens module in an optical axis (the Z-axis) direction, or shake may be corrected by moving the lens module in a direction orthogonal to an optical axis (the Z-axis).

However, as the performance of camera modules has been improved in recent years, the weight of lens modules has also increased, and in addition, due to the effect of the weight of the driving units that move the lens modules, it may be difficult to precisely control a driving force to achieve shake correction.

Additionally, Hall sensors may be used as position sensors to sense a position of a lens module, and as the number of Hall sensors increases, the accuracy of position determination may be improved. However, as the number of Hall sensors increases, a control configuration is complicated, a unit cost increases, and there is a limitation in reducing the magnitude from a mechanical point of view.

Additionally, since the Hall sensor is a method of detecting magnetic force of a permanent magnet, a permanent magnet may be necessary, and thus, there is a problem that the flux of the permanent magnet affects the surrounding electronic components.

SUMMARY

This Summary is provided to introduce a selection of concepts in a simplified form that is further described below in the Detailed Description. This Summary is not intended to identify key features or essential features of the claimed subject matter, nor is it intended to be used as an aid in determining the scope of the claimed subject matter.

Ion a general aspect, a sensor shifting actuator includes a first movable body in which an image sensor having an imaging surface is disposed; a fixed body in which the first movable body is disposed to be movable in a first direction parallel to the imaging surface and a second direction parallel to the imaging surface; a driving unit configured to provide a driving force to the first movable body; and a position sensing unit configured to sense a position of the first movable body, and comprising a sensing coil, disposed on any one of the first movable body and the fixed body, and a sensing yoke unit disposed on the other of the first movable body and the fixed body, wherein the sensing yoke unit comprises a plurality of sensing yokes spaced apart from each other in a direction orthogonal to the imaging surface, and each sensing yoke is configured to change in width in a moving direction of the first movable body.

Each of the plurality of sensing yokes may include a first sensing yoke and a second sensing yoke, and the first sensing yoke and the second sensing yoke each face the sensing coil in a direction parallel to the imaging surface.

The first sensing yoke and the second sensing yoke may each have a width that increases and decreases in a moving direction of the first movable body, and the first sensing yoke and the second sensing yoke may have different positions at which the width is increased or decreased.

The first sensing yoke and the second sensing yoke may each have a plurality of minimum widths and a plurality of maximum widths, a position at which the first sensing yoke has a minimum width is different from a position at which the second sensing yoke has a minimum width, and a position at which the first sensing yoke has a maximum width is different from a position at which the second sensing yoke has a maximum width.

A winding thickness of the sensing coil may be greater than the minimum width of each sensing yoke, and is less than the maximum width of each sensing yoke.

A boundary line defining the width of each sensing yoke of the plurality of sensing yokes may have a sinusoidal wave shape.

A direction of a current flowing through a portion of the sensing coil facing the first sensing yoke may be different from a direction of a current flowing through a portion of the sensing coil facing the second sensing yoke.

A distance between the first sensing yoke and the second sensing yoke in a direction orthogonal to the imaging surface may be less than a distance between both ends of the sensing coil in a direction orthogonal to the imaging surface.

The position sensing unit may include a first position sensor configured to sense a position of the first movable body in the first direction and a second position sensor sensing configured to sense a position of the first movable body in the second direction, wherein the first direction and the second direction may be orthogonal to each other.

The first position sensor may include a first sensing coil disposed on the fixed body and a first sensing yoke unit disposed on the first movable body, the first sensing coil and the first sensing yoke unit may face each other in the second direction, the first sensing yoke unit may include a first sensing yoke and a second sensing yoke spaced apart from each other in a direction orthogonal to the imaging surface, the second position sensor may include a second sensing coil disposed on the fixed body and a second sensing yoke unit disposed on the first movable body, the second sensing coil and the second sensing yoke unit may face each other in the first direction, and the second sensing yoke unit may include a third sensing yoke and a fourth sensing yoke spaced apart from each other in a direction orthogonal to the imaging surface.

The sensor shifting actuator may include a second movable body disposed between the first movable body and the fixed body, wherein the first movable body is movable in the first direction together with the second movable body, and wherein the first movable body is movable in the second direction relative to the second movable body.

The sensor shifting actuator may include a first ball member disposed between the second movable body and the fixed body; and a second ball member disposed between the first movable body and the second movable body, wherein the first ball member is disposed to be rollable in the first direction, and the second ball member is disposed to be rollable in the second direction.

A first magnetic member may be disposed on the second movable body, a second magnetic member may be disposed in a position facing the first magnetic member on each of the first movable body and the fixed body, and an attractive force acts between the first magnetic member and the second magnetic member.

The driving unit may include a coil unit disposed on any one of the first movable body and the fixed body and a movable yoke unit disposed on the other of the first movable body and the fixed body, and wherein the movable yoke unit may be formed of a soft magnetic material the is magnetized by a magnetic field of the coil unit.

The coil unit may include a first coil, a second coil, a third coil, and a fourth coil disposed on the fixed body, the movable yoke unit may include a first movable yoke, a second movable yoke, a third movable yoke, and a fourth movable yoke disposed on the first movable body, the first coil and the second coil are spaced apart from each other in the first direction, the third coil and the fourth coil are spaced apart from each other in the second direction, and the first movable yoke to the fourth movable yoke are arranged to face the first coil to the fourth coil, respectively.

The movable yoke unit may be magnetized when power is supplied to the coil unit, and the movable yoke unit loses magnetism when power supplied to the coil unit is cut off.

In a general aspect, an apparatus includes a camera module including a fixed body; a first movable body configured to move an image sensor in a first direction orthogonal to an optical axis and a second direction orthogonal to the optical axis; a second movable body, disposed between the first movable body and the fixed body; and position sensing units, configured to detect a position of the first movable body in the first direction and the second direction; wherein each of the position sensing units comprises a sensing coil and a sensing yoke unit, wherein the sensing yoke unit comprises a first sensing yoke and a second sensing yoke spaced apart from each other, and wherein each of the first sensing yoke and the second sensing yoke is configured to have a width that continually increases and decreases along a direction in which the first movable body moves.

A position where the first sensing yoke has a maximum width may be different from a position where the second sensing yoke has a maximum width.

A boundary line that defines the width of the first sensing yoke and the width of the second sensing yoke may be configured to have a sinusoidal shape.

Other features and aspects will be apparent from the following detailed description, the drawings, and the claims.

BRIEF DESCRIPTION OF DRAWINGS

Throughout the drawings and the detailed description, the same reference numerals may refer to the same, or like, elements. The drawings may not be to scale, and the relative size, proportions, and depiction of elements in the drawings may be exaggerated for clarity, illustration, and convenience.

DETAILED DESCRIPTION

Figure 1:
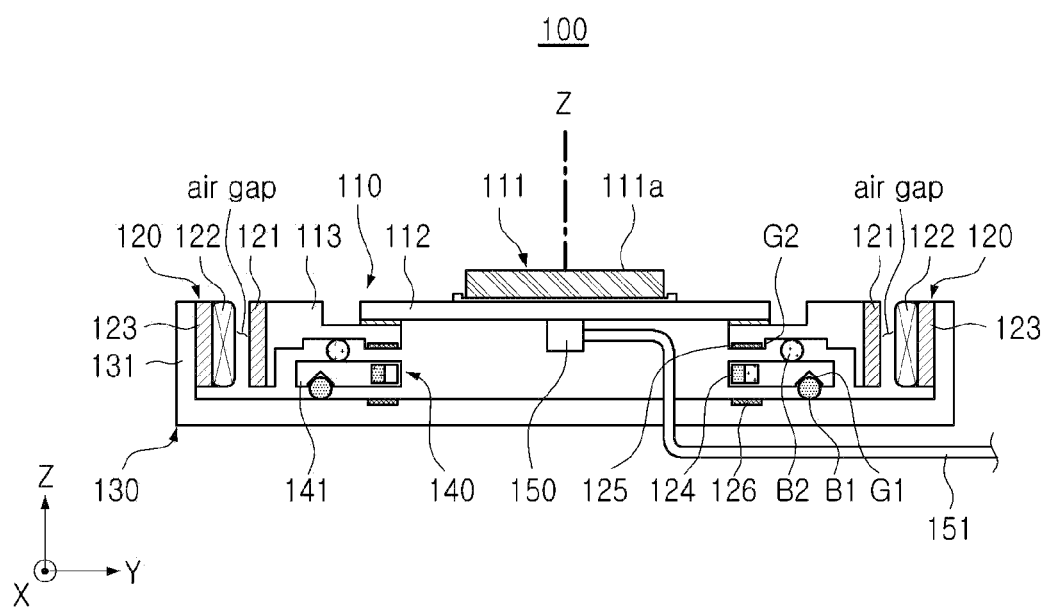
FIG. 1 illustrates a schematic cross-sectional view of an example sensor shifting actuator, in accordance with one or more embodiments.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known, after an understanding of the disclosure of this application, may be omitted for increased clarity and conciseness, noting that omissions of features and their descriptions are also not intended to be admissions of their general knowledge.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween. Likewise, expressions, for example, "between" and "immediately between" and "adjacent to" and "immediately adjacent to" may also be construed as described in the foregoing.

The terminology used herein is for the purpose of describing particular examples only, and is not to be used to limit the disclosure. As used herein, the singular forms "a," "an," and "the" are intended to include the plural forms as well, unless the context clearly indicates otherwise. As used herein, the term "and/or" includes any one and any combination of any two or more of the associated listed items. As used herein, the terms "include," "comprise," and "have" specify the presence of stated features, numbers, operations, elements, components, and/or combinations thereof, but do not preclude the presence or addition of one or more other features, numbers, operations, elements, components, and/or combinations thereof. The use of the term "may" herein with respect to an example or embodiment (for example, as to what an example or embodiment may include or implement) means that at least one example or embodiment exists where such a feature is included or implemented, while all examples are not limited thereto.

Unless otherwise defined, all terms, including technical and scientific terms, used herein have the same meaning as commonly understood by one of ordinary skill in the art to which this disclosure pertains consistent with and after an understanding of the present disclosure. Terms, such as those defined in commonly used dictionaries, are to be interpreted as having a meaning that is consistent with their meaning in the context of the relevant art and the present disclosure, and are not to be interpreted in an idealized or overly formal sense unless expressly so defined herein.

A sensor shifting actuator, in accordance with one or more examples, may be a component of a camera module. Additionally, the camera module may be mounted on a portable electronic device. The portable electronic device may be, as only examples, a portable electronic device, such as a mobile communication terminal, a smartphone, or a tablet PC.

One or more examples may provide a sensor shifting actuator that improves shake correction performance.

FIG. 1 illustrates a schematic cross-sectional view of an example sensor shifting actuator, in accordance with one or more embodiments.

Referring to FIG. 1, the sensor shifting actuator 100 includes a first movable body 110, a fixed body 130, and a driving unit 120.

An image sensor 111 is disposed on the first movable body 110, and the first movable body 110 is disposed to be movable relative to the fixed body 130.

The first movable body 110 is a component that moves together with the image sensor 111. For example, the first movable body 110 may include a sensor substrate 112 on which the image sensor 111 is mounted, and a sensor holder 113 coupled to the sensor substrate 112.

An image sensor 111 may be disposed on a first surface of the sensor substrate 112, and a connector 150 that transmits a signal of the image sensor 111 to the outside may be disposed on a second surface of the sensor substrate 112. A flexible substrate 151 that is flexibly bent according to a movement of the image sensor 111 may be connected to the connector 150.

A signal from the image sensor 111 may be transmitted to other electronic components through the sensor substrate 112, the connector 150, and the flexible substrate 151.

The fixed body 130 may include a base 131 and components fixedly coupled to the base 131. For example, the fixed body 130 may include a coil unit 122 to be described later.

The driving unit 120 may move the first movable body 110 and the image sensor 111.

By an operation of the driving unit 120, the first movable body 110 may move in a direction orthogonal to a direction in which the imaging surface 111a of the image sensor 111 faces, that is, orthogonal to an optical axis, or Z axis direction. In an example, the driving unit 120 may correct a shake that occurs when the camera module (for example, camera module 10, FIG. 12) on which the image sensor 111 is mounted performs an imaging operation.

The driving unit 120 may move the first movable body 110 on which the image sensor 111 is mounted in a first direction (for example, an X-direction) and a second direction (for example, a Y-direction) orthogonal to an optical axis (a Z-axis). The first direction (for example, the X-direction) and the second direction (for example, the Y-direction) may cross each other, or may be perpendicular to each other. For example, the driving unit 120 may cause the first movable body 110 to move in the first direction (for example, the X-direction) and/or the second direction (for example, the Y-direction) orthogonal to the optical axis (the Z-axis), and correct a shake accordingly.

In the one or more examples, the direction in which the imaging surface 111a of the image sensor 111 faces may be referred to as the optical axis (the Z-axis) direction. That is, the first movable body 110 may move in a direction orthogonal to the optical axis (the Z-axis) with respect to the fixed body 130.

In the drawings illustrating the one or more examples, when the first movable body 110 moves in a direction parallel to the imaging surface 111a, it may be understood that the first movable body 110 moves in a direction orthogonal to the optical axis (the Z-axis).

When the first movable body 110 moves in the first direction (for example, the X-direction), it may be understood that the first movable body 110 moves in a direction orthogonal to the optical axis (the Z-axis). In another example, when the movable yoke unit 121 and the coil unit 122 face each other in the first direction (for example, the X-direction), it may be understood that the movable yoke unit 121 and the coil unit 122 face each other in a direction orthogonal to the optical axis (the Z-axis).

Additionally, the first direction (for example, the X-direction) and the second direction (for example, the Y-direction) are examples of two directions orthogonal to the optical axis (the Z-axis) and crossing each other, and in the one or more examples, the first direction (for example, the X-direction) and the second direction (for example, the Y-direction) may be understood as two directions orthogonal to the optical axis (the Z-axis) and crossing, or perpendicular to, each other.

In an example, the actuator 100 may include a second movable body 140 disposed between the first movable body 110 and the fixed body 130. The second movable body 140 may include a guide member 141 and a component (e.g., a first magnetic member 124) fixedly coupled to the guide member 141.

In an example, a first ball member B1 may be disposed between the fixed body 130 and the second movable body 140, and a second ball member B2 may be disposed between the second movable body 140 and the first movable body 110.

At least one of the fixed body 130 and the second movable body 140 may include a first guide groove G1 that accommodates at least a portion of the first ball member B1. For example, the first guide groove G1 may be disposed on at least one of the surfaces on which the fixed body 130 and the second movable body 140 face in the optical axis (the Z-axis) direction.

Each of the second movable body 140 and the first movable body 110 may include a second guide groove G2 that accommodates at least a portion of the second ball member B2. For example, the second guide groove G2 may be disposed on at least one of the surfaces on which the second movable body 140 and the first movable body 110 face in the optical axis (the Z-axis) direction.

In one or more examples, for convenience of description, the first ball member B1, the second ball member B2, the first guide groove G1, and the second guide groove G2 may be described in the singular form, but, in examples, these parts may be provided in plurality.

The first guide groove G1 and the second guide groove G2 may extend in two directions orthogonal to the optical axis (the Z-axis) and may cross each other. In an example, the first guide groove G1 may extend in the first direction (for example, the X-direction), and the second guide groove G2 may extend in the second direction (for example, the Y-direction). The first ball member B1 and the second ball member B2 may be rollable along the first guide groove G1 and the second guide groove G2, respectively.

For example, the first ball member B1 may be rollable in the first direction (for example, the X-direction) along the first guide groove G1, the second ball member B2 may be rollable along the second guide groove G2 in the second direction (for example, the Y-direction).

Accordingly, in an example, the second movable body 140 may move in the first direction (for example, the X-direction) with respect to the fixed body 130, and movement in a direction other than the first direction (for example, the X-direction) may be restricted. Additionally, the first movable body 110 may move in the second direction (for example, the Y-direction) with respect to the second movable body 140, and movement in a direction other than the second direction (for example, the Y-direction) may be restricted.

When a driving force is generated in the first direction (for example, the X-direction), the first movable body 110 and the second movable body 140 may be relatively moved with respect to the fixed body 130 together in the first direction (for example, the X-direction). Additionally, when a driving force is generated in the second direction (for example, the Y-direction), the first movable body 110 may be relatively moved with respect to the second movable body 140 in the second direction (for example, the Y-direction).

In FIG. 1, the first guide groove G1 is formed in the second movable body 140, and the second guide groove G2 is formed in the first movable body 110. However, this is only an example. For example, the first guide groove G1 may be formed in both the base 131 and the guide member 141. That is, the first guide groove G1 may be formed on the surfaces of the base 131 and the guide member 141 facing each other in the optical axis (the Z-axis) direction, respectively. In an example, the first guide groove G1 may be formed in the base 131. Also, the second guide groove G2 may be formed in both the guide member 141 and the sensor holder 113. That is, the second guide groove G2 may be formed on surfaces of the guide member 141 and the sensor holder 113 facing each other in the optical axis (the Z-axis) direction, respectively.

In an example, the second movable body 140 or the guide member 141 may be omitted. For example, the first movable body 110 may move directly on the base 131.

That is, in FIG. 1, the second movable body 140 may be omitted, a ball member may be disposed between the sensor holder 113 and the base 131, and the sensor holder 113 and/or the base 131 may include a guide groove that accommodates the ball member.

Figure 2A:
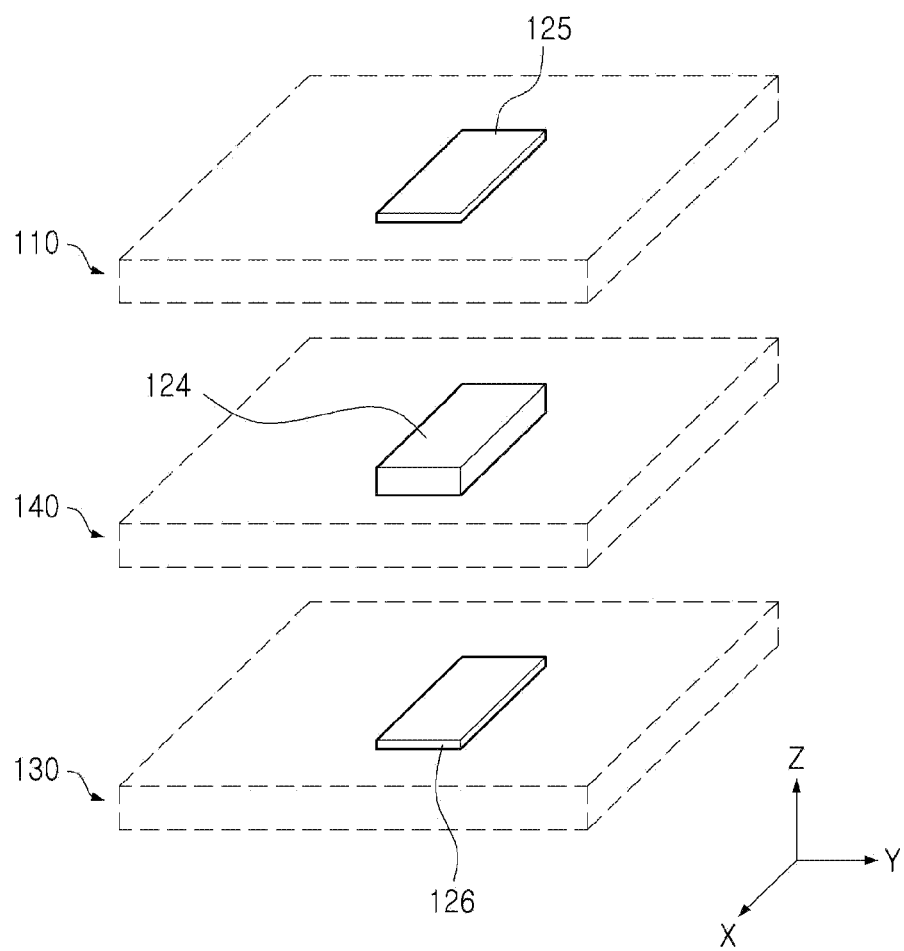
FIG. 2A, FIG. 2B, and FIG. 2C illustrate pulling units or devices, in accordance with one or more embodiments.
Figure 2B:
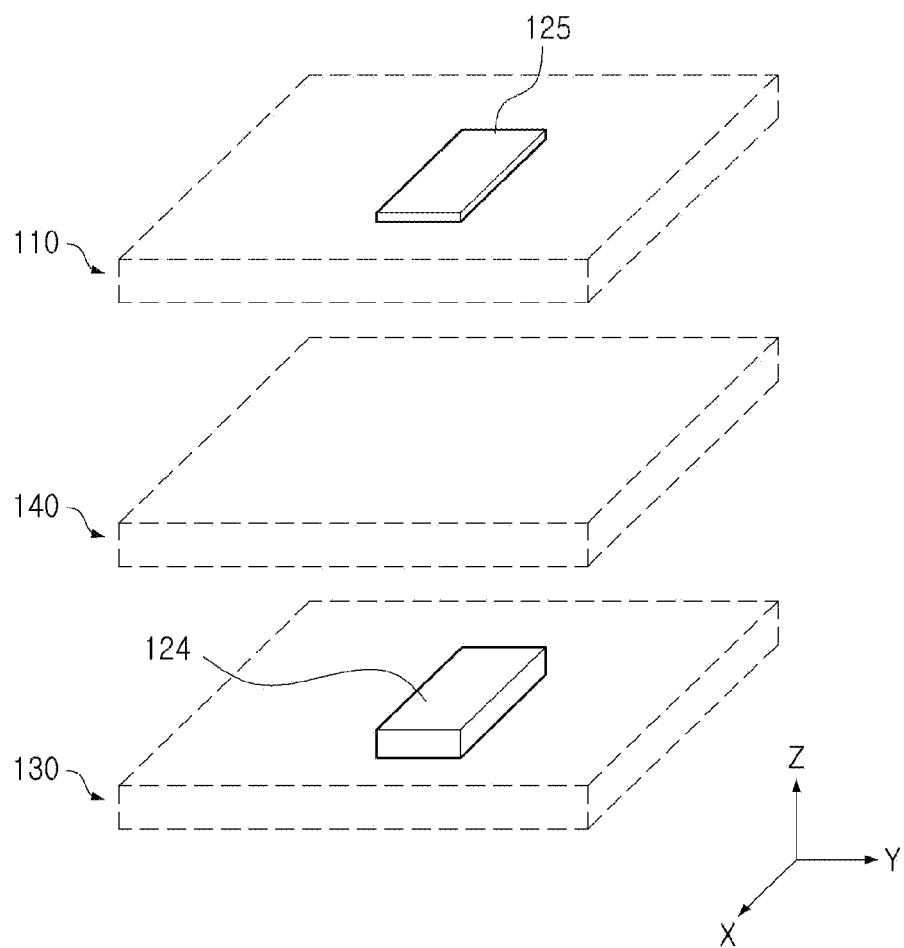
Figure 2C:
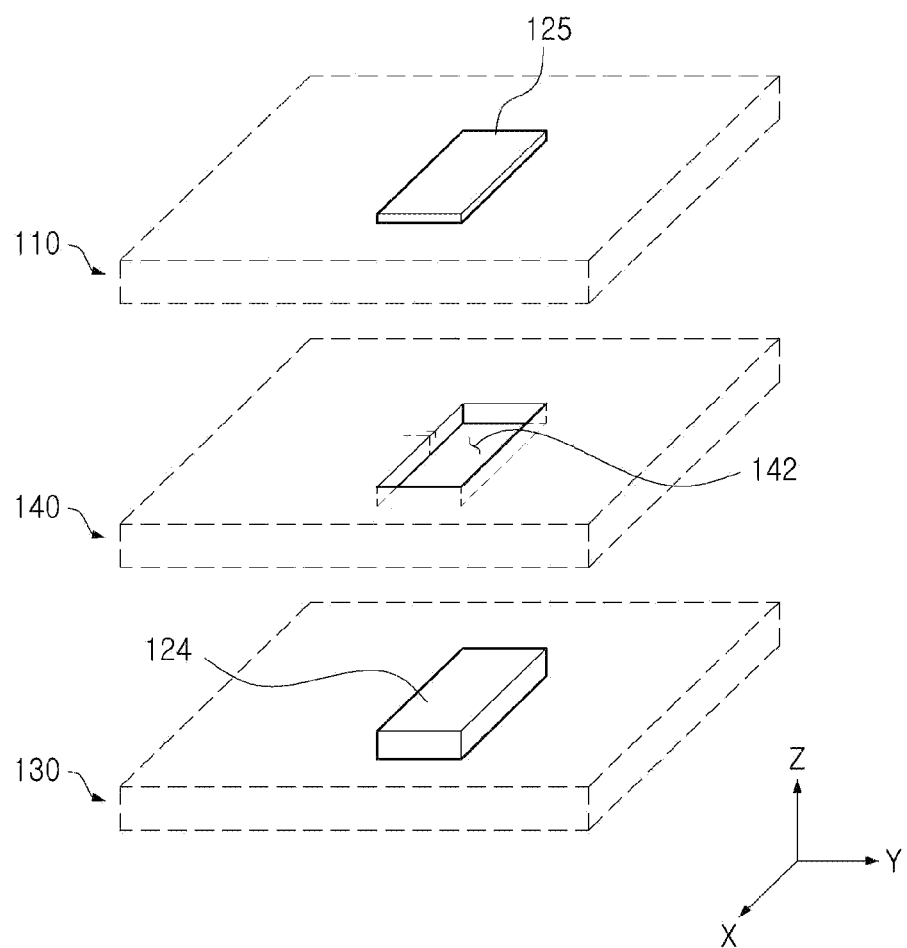

FIGS. 2A through 2C illustrate a pulling unit, in accordance with one or more embodiments.

The first movable body 110 may only move in a direction orthogonal to the optical axis (the Z-axis) and may not move in a direction parallel to the optical axis (the Z-axis). Additionally, the first movable body 110 and the second movable body 140 may be able to maintain contact with the first ball member B1 and the second ball member B2, respectively. Accordingly, the sensor shifting actuator 100 may include a pulling unit.

First, referring to FIG. 2A, the pulling unit may include a first magnetic member 124 and second magnetic members 125 and 126 disposed to face each other in the optical axis (the Z-axis) direction. Magnetic attraction may act between the first magnetic member 124 and the second magnetic members 125 and 126. For example, the first magnetic member 124 may be a permanent magnet, and the second magnetic members 125 and 126 may be a yoke. In another example, both the first magnetic member 124 and the second magnetic members 125 and 126 may be permanent magnets.

In an example, the first magnetic member 124 that is a permanent magnet may be disposed on the second movable body 140 disposed between the first movable body 110 and the fixed body 130. Additionally, the second magnetic members 125 and 126 may be respectively disposed on the first movable body 110 and the fixed body 130, which are positions facing the first magnetic member 124 in the optical axis (the Z-axis) direction, respectively.

Referring to FIGS. 1 and 2A, the first movable body 110 and the fixed body 130 are respectively pulled toward the second movable body 140 by magnetic forces generated between the first magnetic member 124 and the respective second magnetic members 125 and 126, and the first ball member B1 and the second ball member B2 may roll in close contact with the first guide groove G1 and the second guide groove G2, respectively.

When the second movable body 140 is omitted, the first magnetic member 124 and the second magnetic member 125 may be mounted on the sensor holder 113 or the base 131, respectively, so that magnetic forces therebetween may pull the sensor holder 113 toward the base 131 (i.e., in a −Z direction).

Referring to FIGS. 2B and 2C, any one of the first magnetic member 124 and the second magnetic member 125 may be disposed on the fixed body 130, and the other of the first magnetic member 124 and the second magnetic member 125 may be disposed on the first movable body 110.

Even in this example, the first movable body 110 may be pulled toward the fixed body 130 by magnetic force generated between the first magnetic member 124 and the second magnetic member 125.

In the example shown in FIG. 2B, the second movable body 140 is disposed between the first magnetic member 124 and the second magnetic member 125. Contrary to this, in the example shown in FIG. 2C, a through hole 142 may be provided in the second movable body 140 so that the first magnetic member 124 and the second magnetic member 125 may directly face each other in the optical axis (the Z-axis) direction.

Referring back to FIG. 1, in an example, the driving unit 120 includes a coil unit 122 coupled to any one of the first movable body 110 and the fixed body 130, and a movable yoke unit 121 coupled to the other one of the first movable body 110 and the fixed body 130.

In an example, the coil unit 122 may be coupled to the base 131, and the movable yoke unit 121 may be coupled to the sensor holder 113. The movable yoke unit 121 and the coil unit 122 face each other in a direction orthogonal to the optical axis (the Z-axis). An electromagnetic interaction between the movable yoke unit 121 and the coil unit 122 causes the first movable body 110 to move in a direction orthogonal to the optical axis (the Z-axis) with respect to the fixed body 130.

In an example, the driving unit 120 may further include a back yoke unit 123 disposed on one side of the coil unit 122. The back yoke unit 123 allows a magnetic field generated in the coil unit to be concentrated only in a direction toward the movable yoke unit 121. Since the back yoke unit 123 may be disposed on one side of the coil unit 122, it is possible to prevent or minimize the magnetic field generated by the coil unit 122 from affecting other electronic components. The back yoke unit 123 may be disposed between the base 131 and the coil unit 122.

In the one or more examples, the coil unit 122 may be coupled to the fixed body 130, and the movable yoke unit 121 may be coupled to the first movable body 110. However, this is for convenience of description, and in another example, the coil unit 122 may be coupled to the first movable body 110 and the movable yoke unit 121 may be coupled to the fixed body 130.

An air gap may be formed between the coil unit 122 and the movable yoke unit 121 facing each other. For example, a space may be formed between the coil unit 122 and the movable yoke unit 121 which face each other. That is, there may be no other member (e.g., a magnet) between the coil unit 122 and the movable yoke unit 121 which face each other. The coil unit 122 and the movable yoke unit 121 may directly face each other with an air gap therebetween.

In an example, the driving unit 120 may not include a permanent magnet. In an example, when no current flows in the coil unit 122, the magnetic field due to the movable yoke unit 121 may be 0 (zero) or at a very small level. Accordingly, it is possible to prevent or minimize the magnetic field caused by the driving unit 120 itself from affecting other electronic components (e.g., other electronic components inside the camera module 1, or electronic components inside another camera module 1).

In an example, the movable yoke unit 121 may be formed of a soft magnetic material. The soft magnetic material has a small coercive force and is magnetized when exposed to a magnetic field, but loses magnetism or has a relatively low level of magnetism when the magnetic field disappears.

When a current is applied to the coil unit 122, the movable yoke unit 121 is magnetized, thereby generating a reluctance force between the coil unit 122 and the movable yoke unit 121. An attractive force is generated in a direction in which the movable yoke unit 121 and the coil unit 122 face each other, which causes the first movable body 110 to move in the corresponding direction with respect to the fixed body 130.

Figure 3:
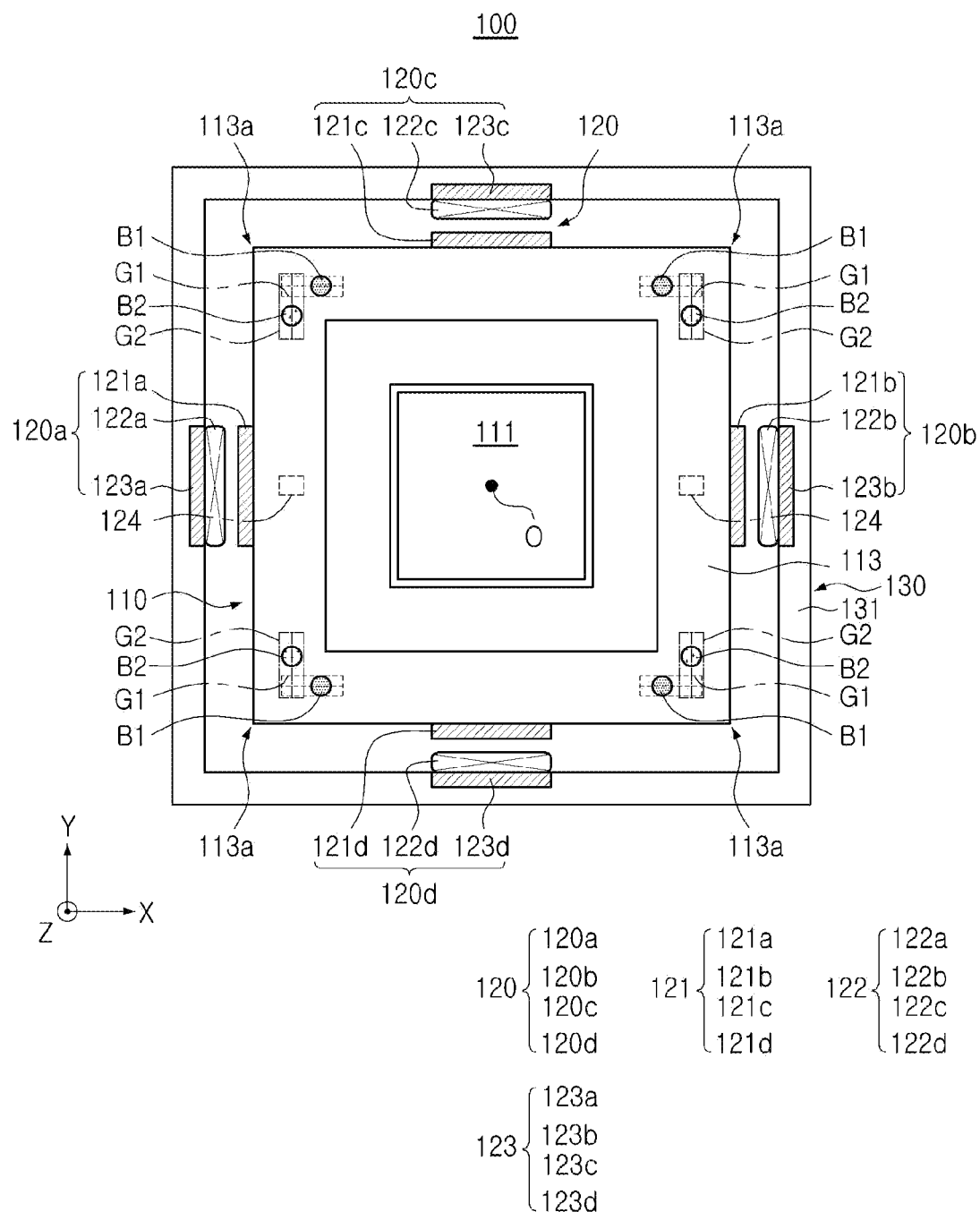
FIG. 3 illustrates a schematic plan view of an example sensor shifting actuator, in accordance with one or more embodiments.

FIG. 3 is a schematic plan view of a sensor shifting actuator, in accordance with one or more embodiments.

Referring to FIG. 3, the coil unit 122 includes a first coil 122a, a second coil 122b, a third coil 122c, and a fourth coil 122d, and the movable yoke unit 121 includes a first movable yoke 121a, a second movable yoke 121b, a third movable yoke 121c, and a fourth movable yoke 121d. Additionally, the back yoke unit 123 includes a first back yoke 123a, a second back yoke 123b, a third back yoke 123c, and a fourth back yoke 123d.

The first coil 122a to the fourth coil 122d of the coil unit 122 may each be disposed on the inner surface of the base 131. The first coil 122a and the second coil 122b may be spaced apart from each other in the first direction (for example, the X-direction), and the third coil 122c and the fourth coil 122d may be spaced apart from each other in the second direction (for example, the Y-direction). Accordingly, a direction in which the first coil 122a and the second coil 122b are spaced apart from each other is orthogonal to a direction in which the third coil 122c and the fourth coil 122d are spaced apart from each other.

The first movable yoke 121a to the fourth movable yoke 121d may be disposed on an outer surface of the sensor holder 113 to face the first coil 122a to the fourth coil 122d, respectively.

When a current is applied to the first coil 122a, an attractive force is generated between the first coil 122a and the first movable yoke 121a, which may move the first movable body 110 in a −X-direction. Conversely, when a current is applied to the second coil 122b, an attractive force is generated between the second coil 122b and the second movable yoke 121b, which may move the first movable body 110 in a +X-direction.

Additionally, when a current is applied to the third coil 122c, an attractive force is generated between the third coil 122c and the third movable yoke 121c, which may move the first movable body 110 in a +Y-direction. Conversely, when a current is applied to the fourth coil 122d, an attractive force is generated between the fourth coil 122d and the fourth movable yoke 121d, which may move the first movable body 110 in a −Y-direction.

The driving unit 120 may include a plurality of unit driving units 120a, 120b, 120c, and 120d. Each of the plurality of unit driving units 120a, 120b, 120c, and 120d may include one movable yoke and one coil facing each other.

Since only attractive forces are generated between the coil and the movable yoke which face each other, at least two unit driving units may be necessary to reciprocate the first movable body 110 in either direction.

Referring to FIG. 3, in order to correct a shake in the X-direction, the driving unit 120 may include a first unit driving unit 120a disposed in the −X-direction of the first movable body 110 and a second unit driving unit 120b disposed in the +X-direction of the first movable body 110.

The first unit driving unit 120a may include a first movable yoke 121a coupled to the sensor holder 113 and a first coil 122a coupled to the base 131. The second unit driving unit 120b may include a second movable yoke 121b coupled to the sensor holder 113 and a second coil 122b coupled to the base 131.

In order to correct a shake in the Y-direction, the driving unit 120 may include a third unit driving unit 120c disposed in the +Y-direction of the first movable body 110 and a fourth unit driving unit 120d disposed in the −Y-direction of the first movable body 110.

The third unit driving unit 120c may include a third movable yoke 121c coupled to the sensor holder 113 and a third coil 122c coupled to the base 131. The fourth unit driving unit 120d may include a fourth movable yoke 121d coupled to the sensor holder 113 and a fourth coil 122d coupled to the base 131.

FIGS. 4A through 4D schematically illustrate a state in which the first movable body 110 is moved.

Figure 4A:
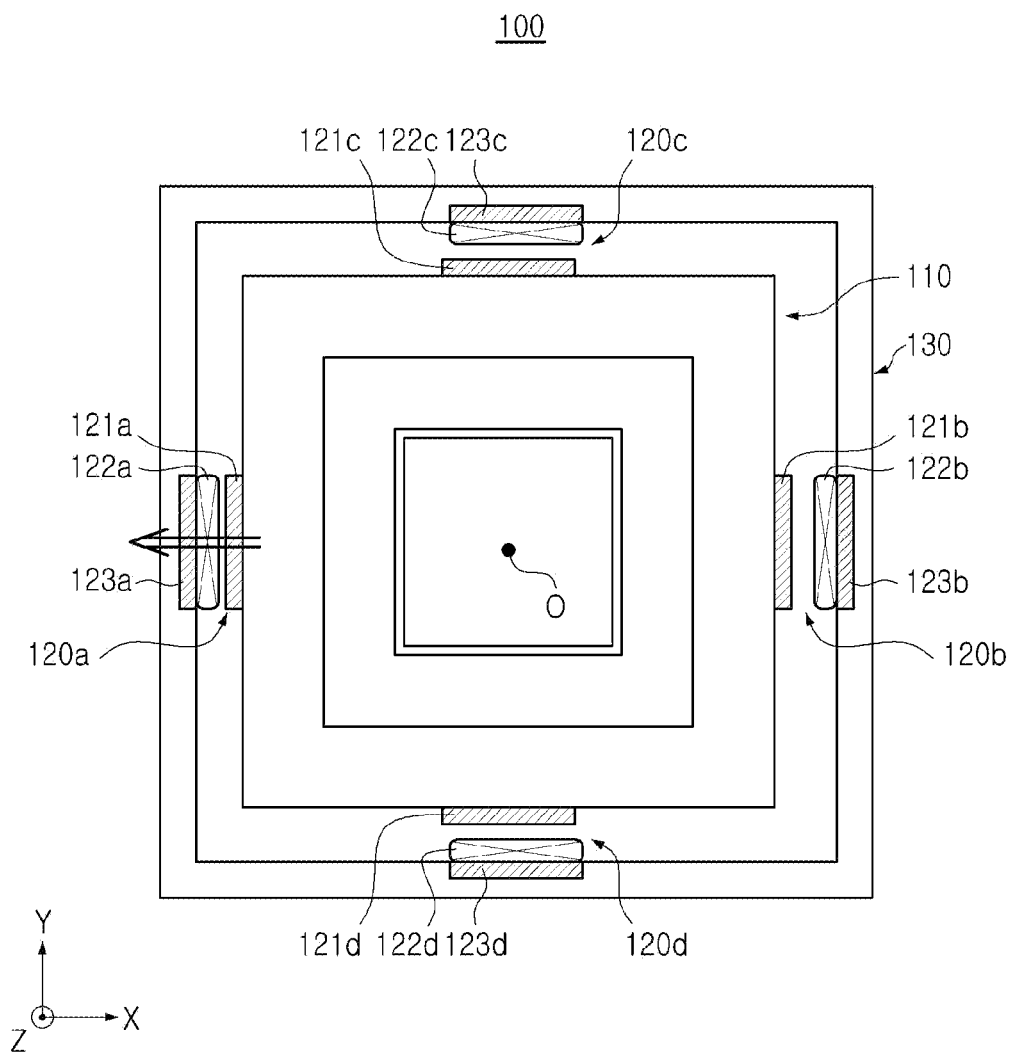
FIG. 4A, FIG. 4B, FIG. 4C, and FIG. 4D schematically illustrate a state in which a first movable body is moved, in accordance with one or more embodiments.

Referring to FIG. 4A, when a current is applied to the first coil 122a, the first coil 122a may pull the first movable yoke 121a in the direction of the arrow, which may move the first movable body 110 in the −X-direction.

Figure 4B:
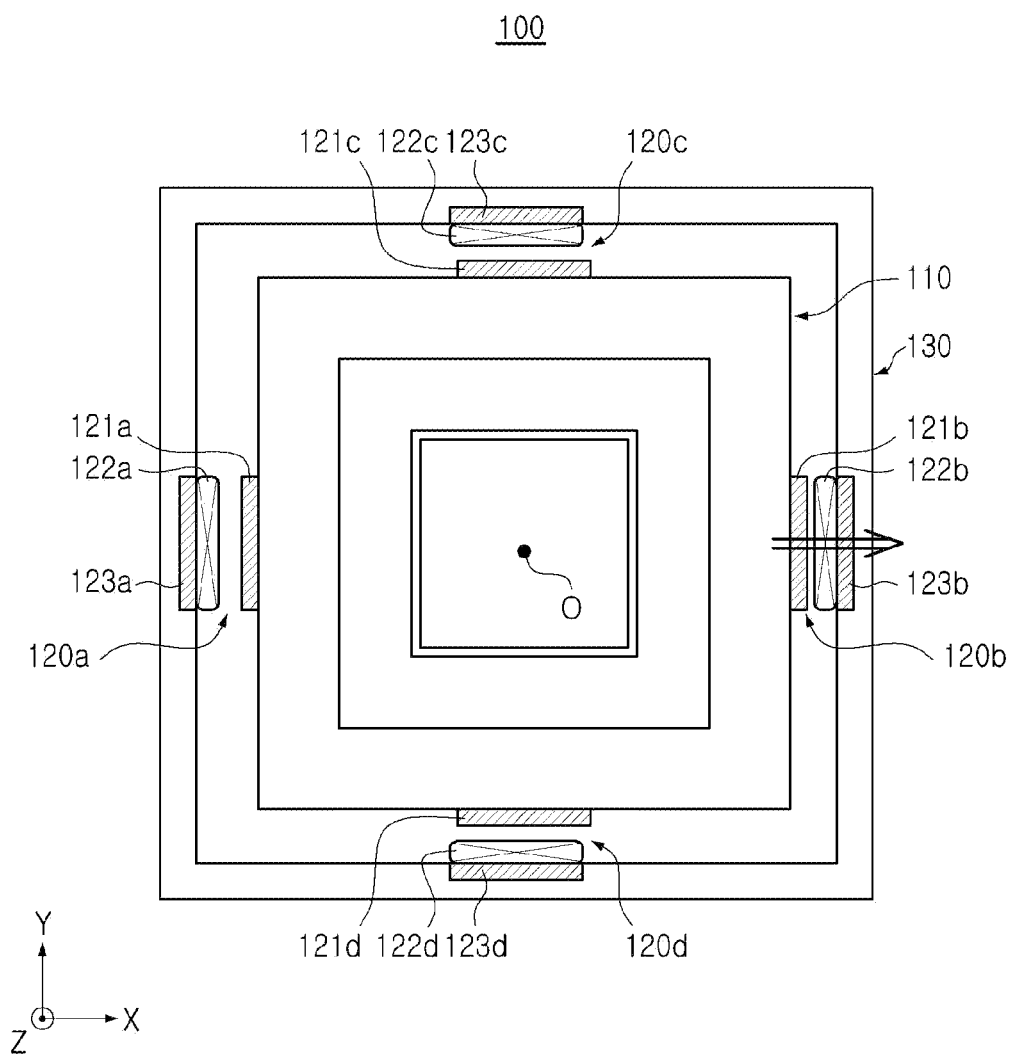

Referring to FIG. 4B, when a current is applied to the second coil 122b, the second coil 122b may pull the second movable yoke 121b in the direction of the arrow, which may move the first movable body 110 in the +X-direction.

Figure 4C:
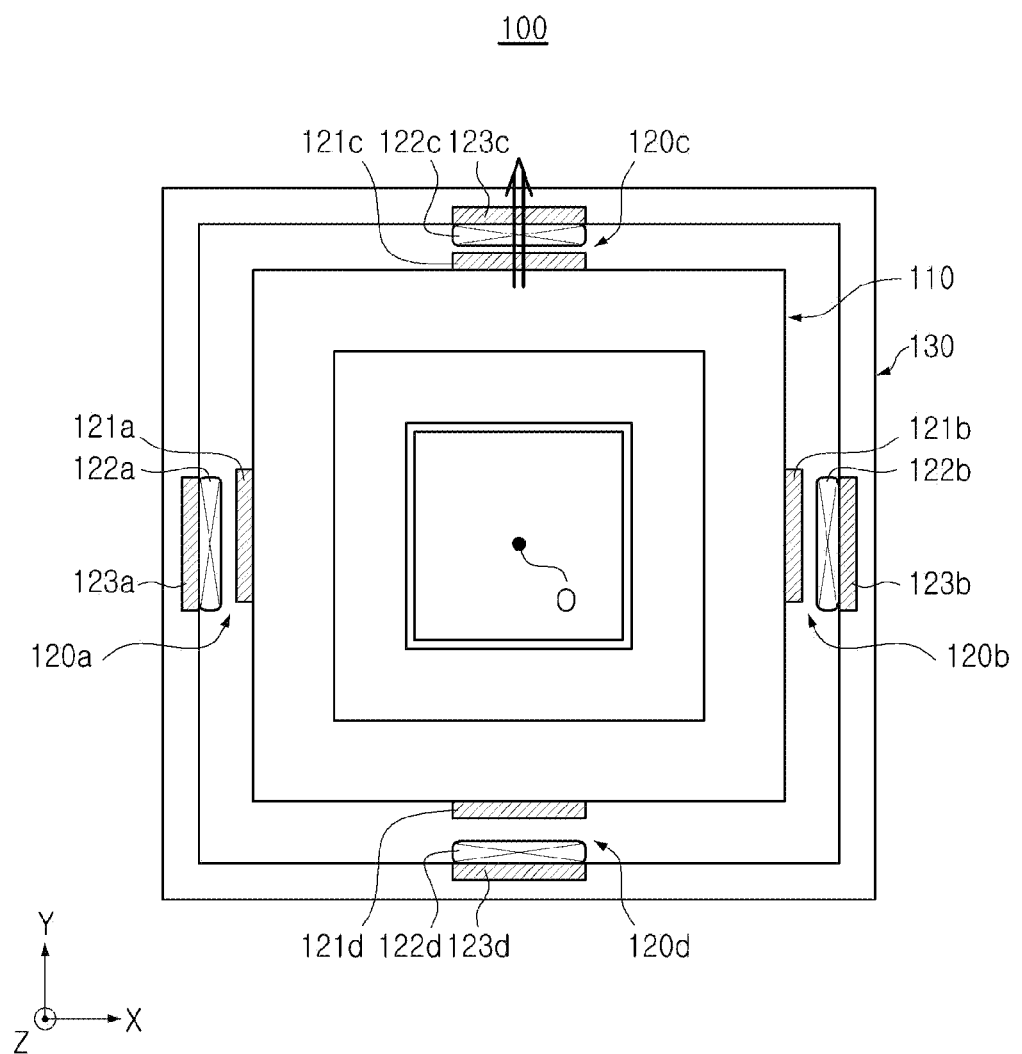

Referring to FIG. 4C, when a current is applied to the third coil 122c, the third coil 122c may pull the third movable yoke 121c in the direction of the arrow, which may move the first movable body in the +Y-direction.

Figure 4D:
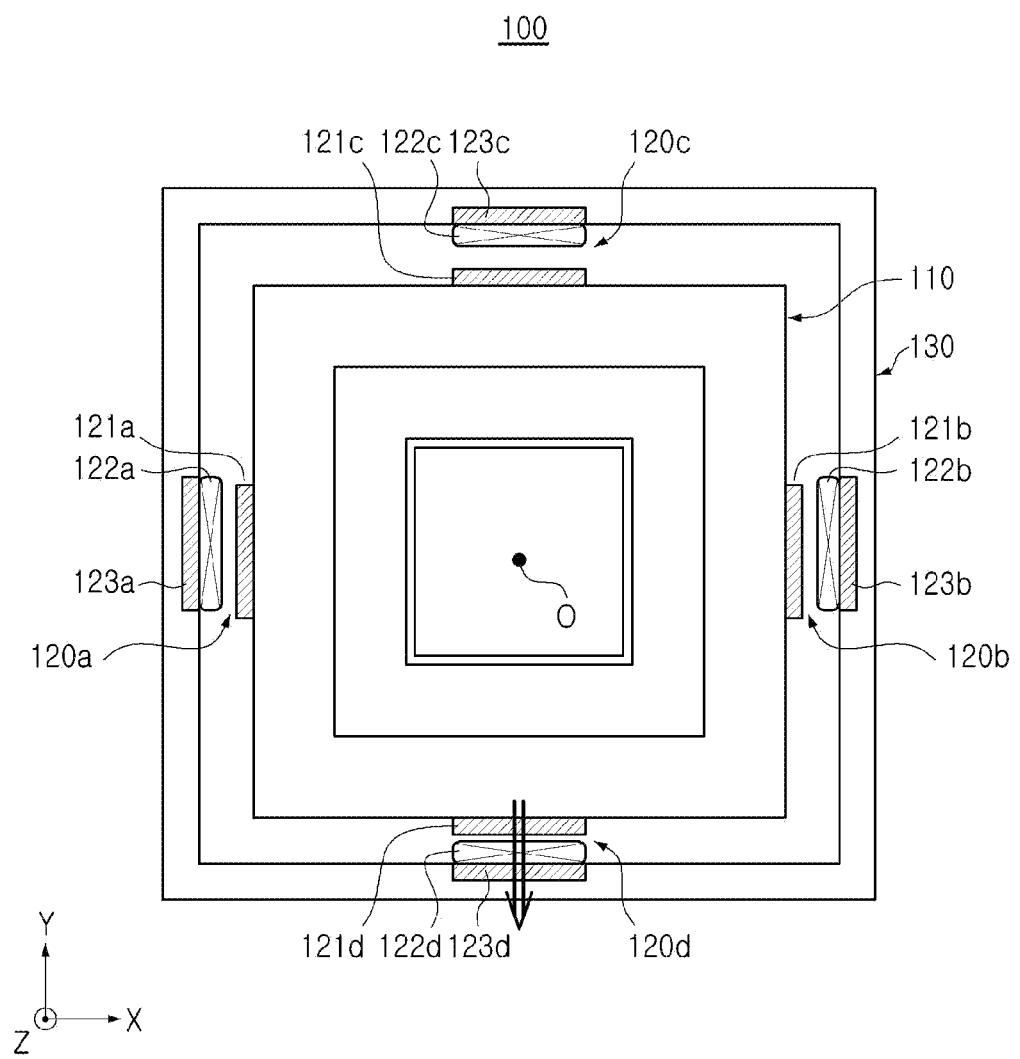

Referring to FIG. 4D, when a current is applied to the fourth coil 122d, the fourth coil 122d may pull the fourth movable yoke 121d in the direction of the arrow, which may move the first movable body 110 in the −Y-direction.

Figure 5:
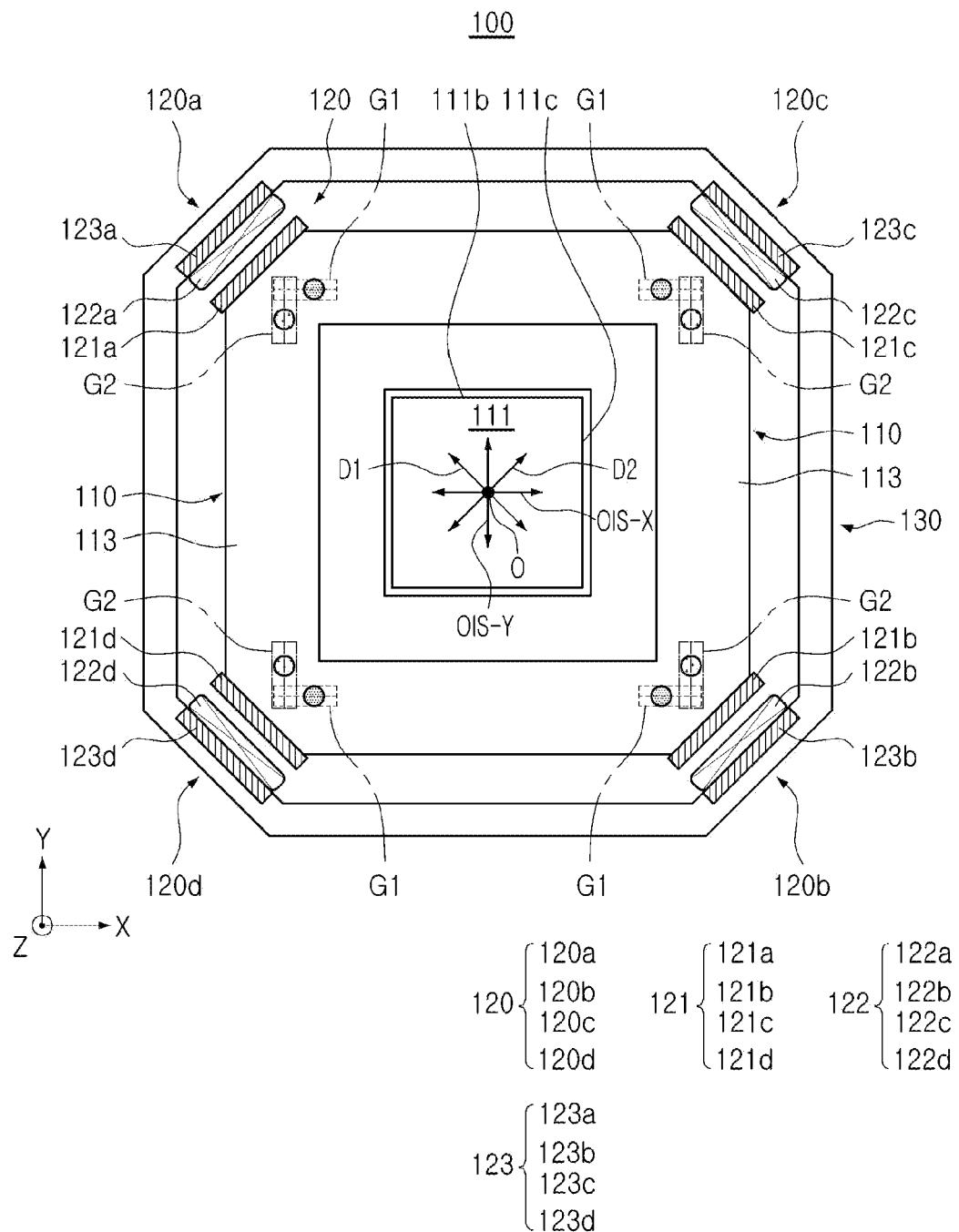
FIG. 5 illustrates an example in which a position of a driving unit or driver is changed in a sensor shifting actuator, in accordance with one or more embodiments.

FIG. 5 illustrates an example in which a position of a driving unit is changed in a sensor shifting actuator, in accordance with one or more embodiments.

Referring to FIG. 5, the plurality of driving units 120a, 120b, 120c, and 120d may be arranged in a direction diagonal to a driving direction of the image sensor 111.

In an example, the first movable body 110 may move in two directions orthogonal to the optical axis (the Z-axis) and orthogonal to each other. For example, the first movable body 110 may move in the X-direction and the Y-direction.

The image sensor 111 may include a horizontal side 111b that extends in the X-direction and a vertical side 111c that extends in the Y-direction, and the first guide groove G1 and the second guide groove G2 may extend in the X-direction and the Y-direction, respectively.

The plurality of driving units 120a, 120b, 120c, and 120d may be disposed in a direction orthogonal to the optical axis (the Z-axis), and may cross two mutually orthogonal moving directions (the X-direction and the Y-direction).

For example, the first unit driving unit 120a and the second unit driving unit 120b may be disposed to be spaced apart from each other in a first diagonal direction D1 of the image sensor 111. The third unit driving unit 120c and the fourth unit driving unit 120d may be disposed to be spaced apart from each other in a second diagonal direction D2 of the image sensor 111.

In an example, each coil and each movable yoke of each of the driving units may face each other in a direction between the first direction (for example, the X-direction) and the second direction (for example, the Y-direction). For example, when the driving unit 120 is configured to move the first movable body 110 in the first direction (for example, the X-direction) and the second direction (for example, the Y-direction), each coil and each movable yoke may face each other in the directions D1 and D2 forming an angle of 45 degrees with an X axis or a Y axis.

FIGS. 6A to 6D schematically illustrate a state in which the first movable body is moved in the arrangement of the driving unit as shown in FIG. 5.

Figure 6A:
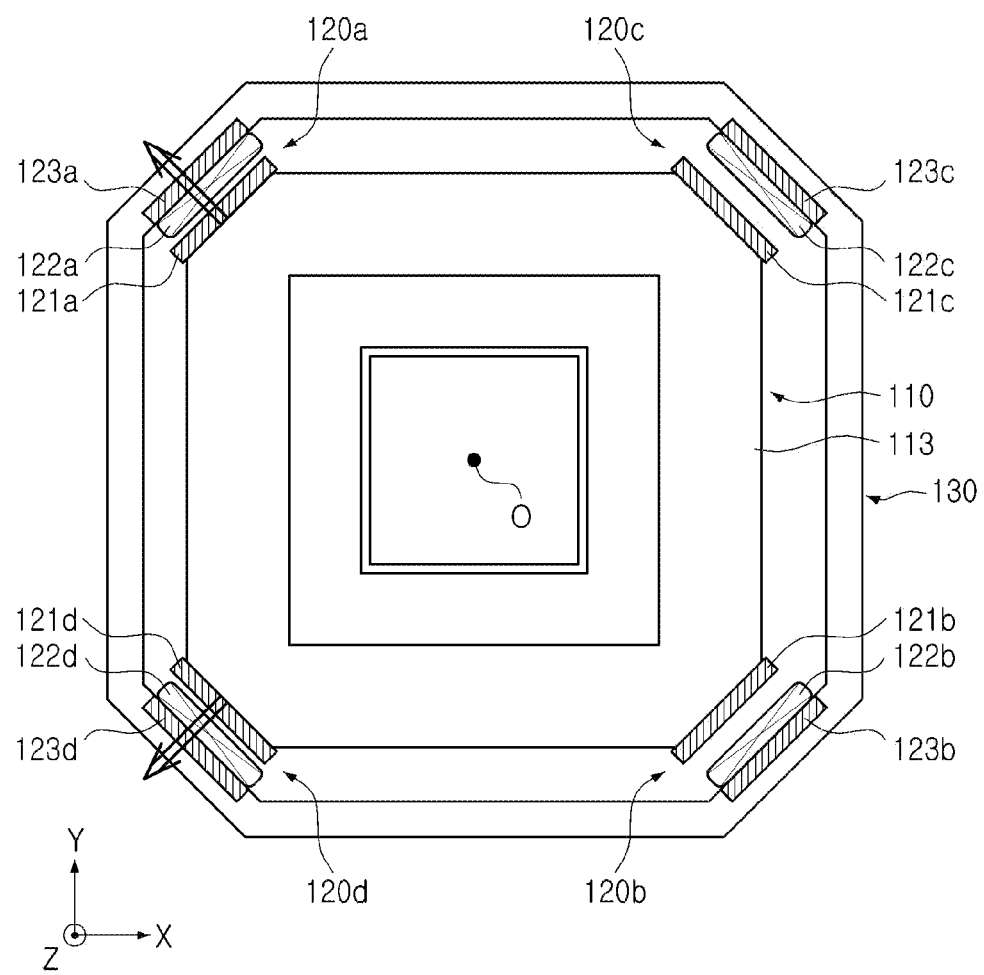
FIG. 6A, FIG. 6B, FIG. 6C, and FIG. 6D schematically illustrate a state in which a first movable body is moved in an arrangement of the driving unit as shown in FIG. 5.

Referring to FIG. 6A, when a current is applied to the first coil 122a and the fourth coil 122d, the first coil 122a and the fourth coil 122d may pull the first movable yoke 121a and the fourth movable yoke 121d in the respective directions of the arrows, and accordingly, the first movable body 110 may be moved in the −X-direction.

Figure 6B:
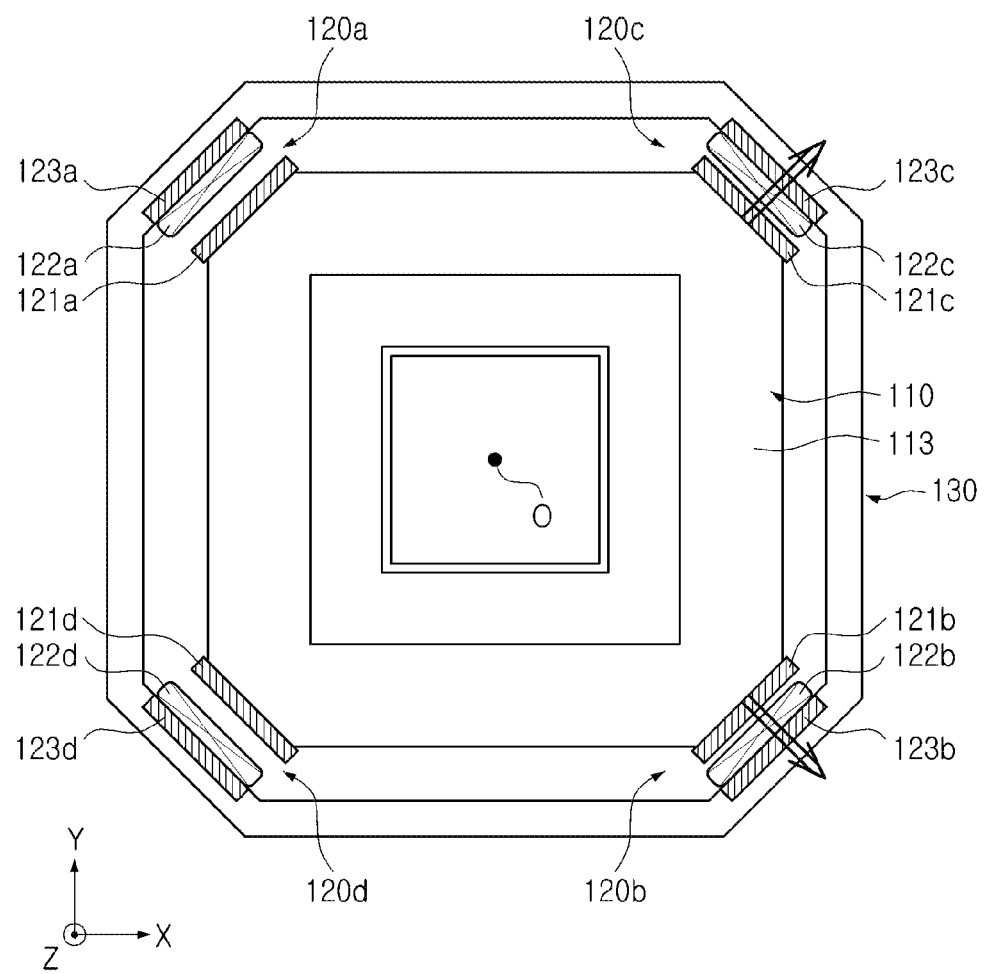

Referring to FIG. 6B, when a current is applied to the second driving coil 122b and the third driving coil 122c, the second driving coil 122b and the third driving coil 122c may pull the second driving yoke 121b and the third driving yoke 121c in the respective directions of the arrows, and accordingly, the first movable body 110 may be moved in the +X-direction.

Figure 6C:
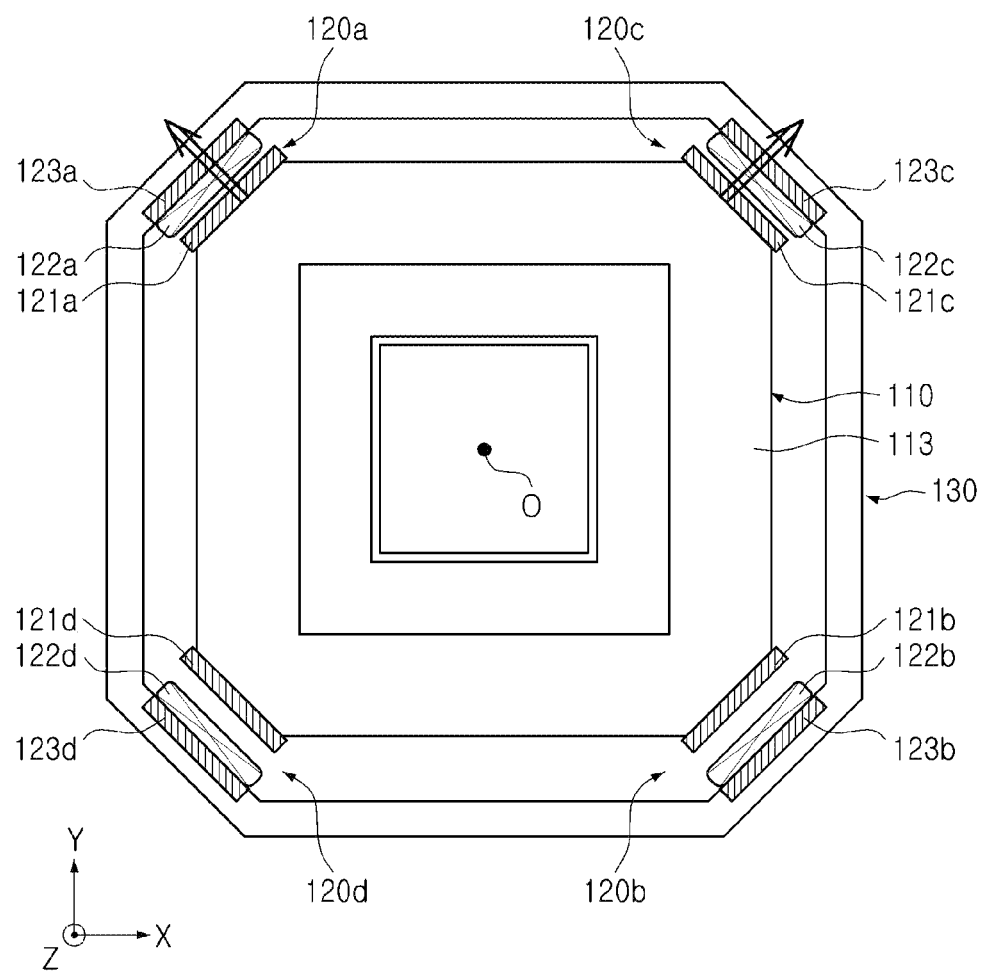

Referring to FIG. 6C, when a current is applied to the first driving coil 122a and the third driving coil 122c, the first driving coil 122a and the third driving coil 122c may pull the first driving yoke 121a and the third driving yoke 121c in the respective directions of the arrows, and accordingly, the first movable body 110 may be moved in the +Y-direction.

Figure 6D:
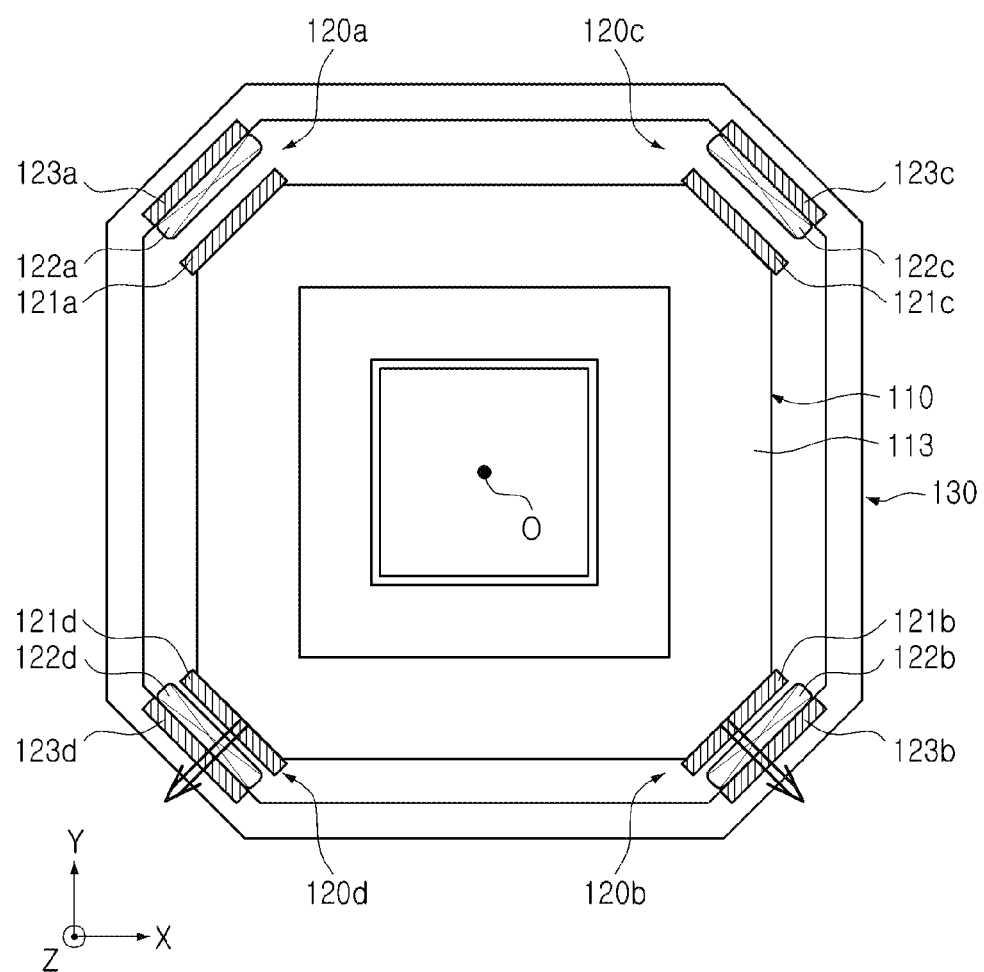

Referring to FIG. 6D, when a current is applied to the second driving coil 122b and the fourth driving coil 122d, the second driving coil 122b and the fourth driving coil 122d may pull the second driving yoke 121b and the fourth driving yoke 121d in the respective directions of the arrows and accordingly, the first movable body 110 may be moved in the −Y-direction.

Figure 7A:
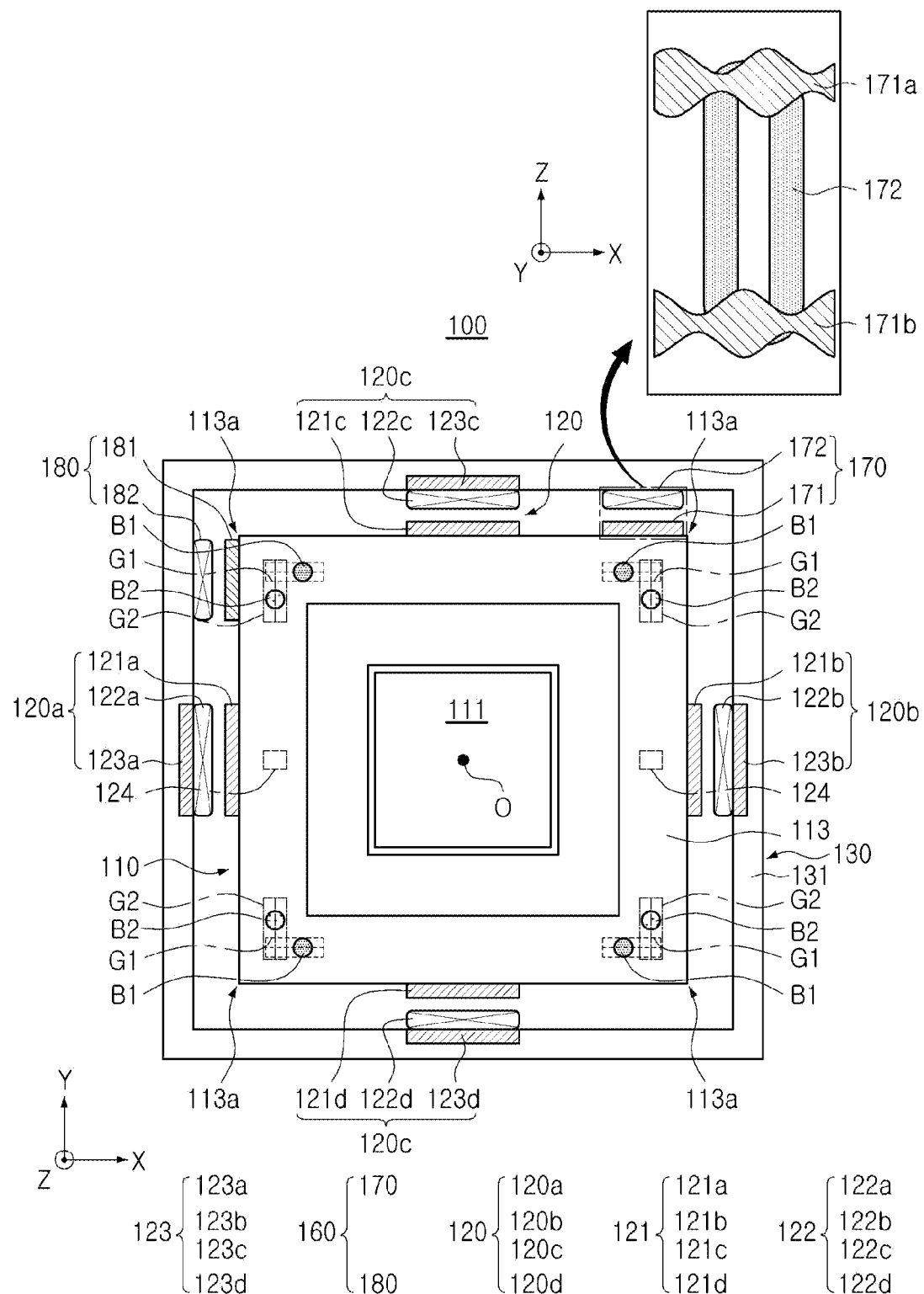
FIG. 7A and FIG. 7B illustrate an example in which a position sensing unit or sensor is further included in the example of FIG. 3.
Figure 7B:
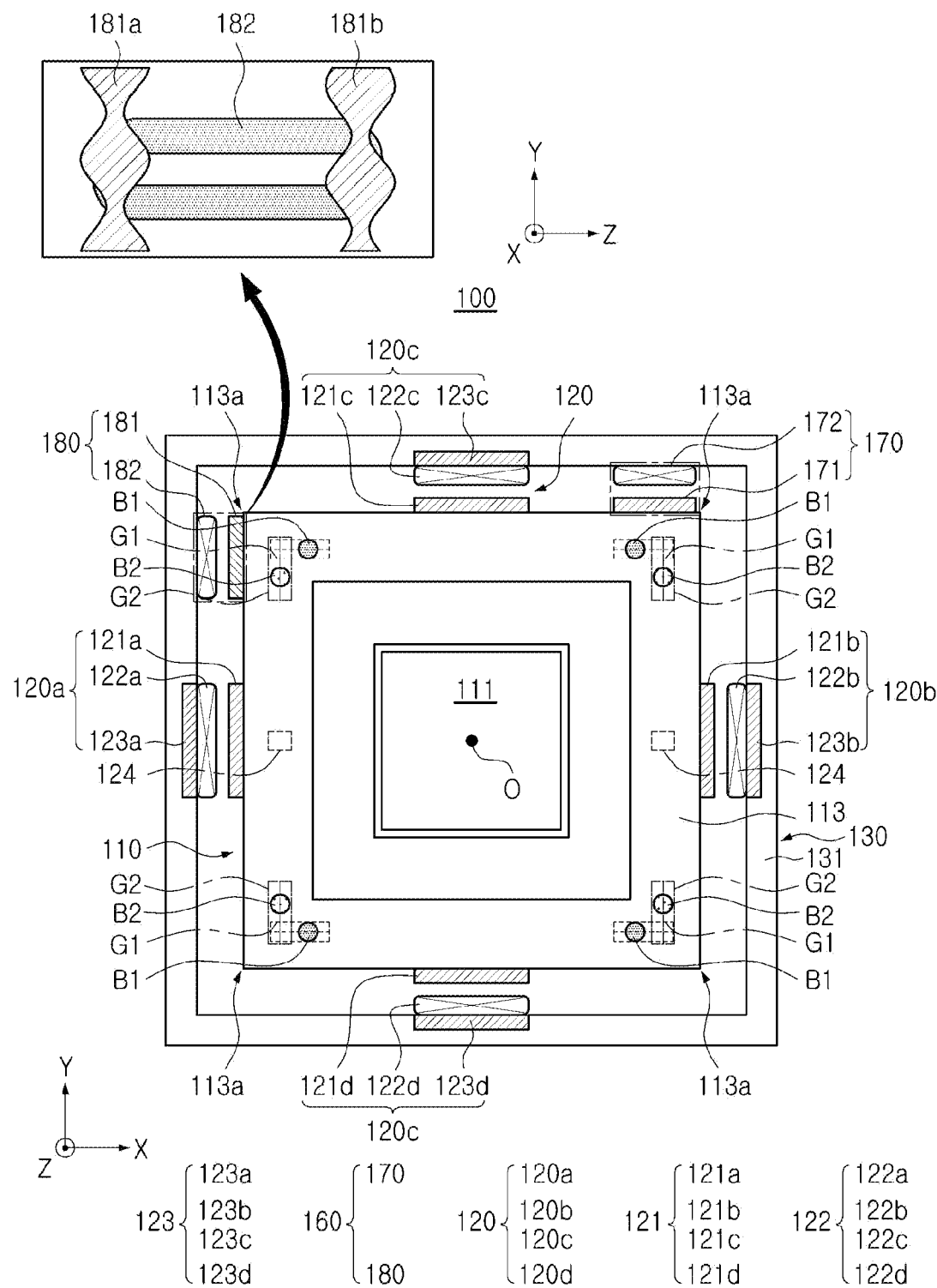
Figure 8:
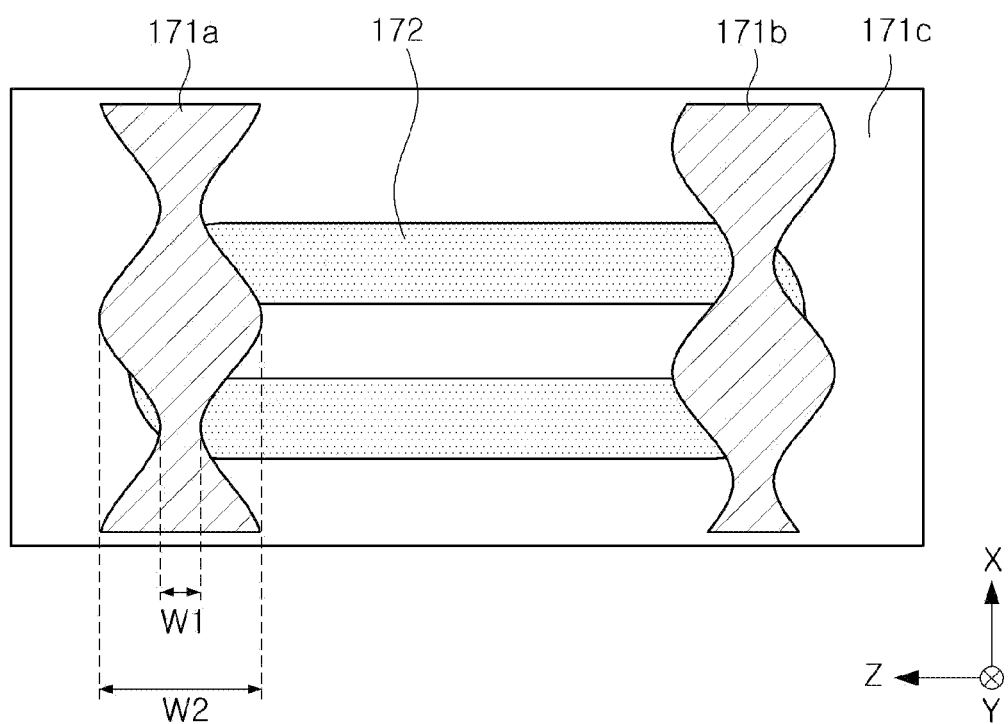
FIG. 8 illustrates a view of a sensing yoke and a sensing coil of the position sensor, in accordance with one or more embodiments.

FIGS. 7A and 7B illustrate examples in which a position sensing unit is further included in the example of FIG. 3, and FIG. 8 is a view illustrating a sensing yoke unit and a sensing coil of the position sensing unit, in accordance with one or more embodiments.

Referring to FIGS. 7A, 7B, and 8, the sensor shifting actuator 100, in accordance with one or more embodiments, may further include a position sensing unit 160.

For example, when the first moving body 110 is moved in the first direction (for example, the X-direction), a position of the first moving body 110 may be sensed by the position sensing unit 160, and when the first moving body 110 may be moved in the second direction (for example, the Y-direction), a position of the first movable body 110 may be sensed by the position sensing unit 160.

The position sensing unit 160 includes a first position sensor 170 and a second position sensor 180. The first position sensor 170 may be used to detect the position of the first movable body 110 in the first direction (for example, the X-direction), and the second position sensor 180 may be used to detect the position of the first movable body 110 in the second direction (for example, the Y-direction).

The first position sensor 170 includes a first sensing coil 172 and a first sensing yoke unit 171. One of the first sensing coil 172 and the first sensing yoke unit 171 may be disposed on the first movable body 110, and the other of the first sensing coil 172 and the first sensing yoke unit 171 may be disposed on the fixed body 130. In an example, the first sensing yoke unit 171 may be disposed on the sensor holder 113, and the first sensing coil 172 may be disposed on the base 131. Accordingly, the first sensing yoke unit 171 may be a moving member that moves together with the sensor holder 113.

The first sensing coil 172 and the first sensing yoke unit 171 may be disposed to face each other in a direction orthogonal to the optical axis (the Z-axis). In an example, the first sensing coil 172 and the first sensing yoke unit 171 may be disposed to face each other in the second direction (the Y-direction).

The first sensing yoke unit 171 may include a first sensing yoke 171a and a second sensing yoke 171b spaced apart from each other.

The second position sensor 180 includes a second sensing coil 182 and a second sensing yoke unit 181. One of the second sensing coil 182 and the second sensing yoke unit 181 may be disposed on the first movable body 110, and the other of the second sensing coil 182 and the second sensing yoke unit 181 may be disposed on the fixed body 130. In an example, the second sensing yoke unit 181 may be disposed on the sensor holder 113, and the second sensing coil 182 may be disposed on the base 131. Accordingly, the second sensing yoke unit 181 may be a moving member that moves together with the sensor holder 113.

The second sensing coil 182 and the second sensing yoke unit 181 may be disposed to face each other in a direction orthogonal to the optical axis (the Z-axis). In an example, the second sensing coil 182 and the second sensing yoke unit 181 may be disposed to face each other in the first direction (for example, the X-direction).

The second sensing yoke unit 181 may include a third sensing yoke 181a and a fourth sensing yoke 181b spaced apart from each other.

Since a configuration and sensing method of the first position sensor 170 and the second position sensor 180 are the same, only the first position sensor 170 will be described below for convenience of description.

Inductance of the first sensing coil 172 may be changed according to a change in the position of the first sensing yoke unit 171.

Specifically, when the first sensing yoke unit 171 moves in one direction, a magnitude of an eddy current of the first sensing yoke unit 171 affecting the inductance of the first sensing coil 172 may be changed, strength of a magnetic field may be changed according to the eddy current, and accordingly, the inductance of the first sensing coil 172 may be changed.

The first sensing yoke unit 171 may be a conductor or a magnetic material.

The sensor shifting actuator 100 may determine a displacement of the first movable body 110 from the change in the inductance of the first sensing coil 172. For example, the sensor shifting actuator 100 may additionally include at least one capacitor, and the at least one capacitor and the first sensing coil 172 may form a predetermined oscillation circuit.

For example, at least one capacitor may be provided to correspond to the number of first sensing coils 172, and one capacitor and one first sensing coil 172 may be configured in the same form as a predetermined LC oscillator, and additionally, at least one capacitor and the first sensing coil 172 may be configured in the form of a typical Colpitts oscillator.

The sensor shifting actuator 100 may determine a displacement of the first movable body 110 from a change in a frequency of an oscillation signal generated by the oscillation circuit. Specifically, when the inductance of the first sensing coil 172 forming the oscillation circuit is changed, the frequency of the oscillation signal generated by the oscillation circuit may be changed, and thus, a displacement of the first movable body 110 may be detected based on the change in the frequency.

Referring to FIG. 8, the first sensing yoke unit 171 may include a first sensing yoke 171a and a second sensing yoke 171b.

In an example, the first sensing yoke unit 171 may further include a support member 171c on which the first sensing yoke 171a and the second sensing yoke 171b are disposed. The support member 171c may be attached to the sensor holder 113.

In an example, the first sensing yoke 171a and the second sensing yoke 171b may be attached to the support member 171c. In another example, the first sensing yoke 171a and the second sensing yoke 171b may be manufactured to be integrated with the support member 171c by an insert injection method, as only an example.

However, the one or more examples are not limited thereto, and the first sensing yoke unit 171 may not include the support member 171c, and in this example, the first sensing yoke 171a and the second sensing yoke 171b may be directly attached to the sensor holder 113 or may be manufactured to be integrated with the sensor holder 113 by an insert injection method, as only an example.

The first sensing yoke 171a and the second sensing yoke 171b may be disposed to be spaced apart from each other in the optical axis (the Z-axis) direction. Additionally, each sensing yoke may be disposed to face a portion of the first sensing coil 172. For example, the first sensing yoke 171a and the second sensing yoke 171b may be disposed to face the first sensing coil 172 in the second direction (for example, the Y-direction), respectively.

A direction of a current flowing in a portion of the first sensing coil 172 facing the first sensing yoke 171a may be different from a direction of a current flowing in a portion of the first sensing coil 172 facing the second sensing yoke 171b. In an example, a direction of a current flowing in a portion of the first sensing coil 172 facing the first sensing yoke 171a may be opposite to a direction of a current flowing in a portion of the first sensing coil 172 facing the second sensing yoke 171b.

A distance between the first sensing yoke 171a and the second sensing yoke 171b in the optical axis (the Z-axis) direction may be shorter than a distance between both ends of the first sensing coil 172 in the optical axis (the Z-axis) direction.

Each of the first sensing yoke 171a and the second sensing yoke 171b may be disposed to move together with the first movable body 110, and may have a width that varies according to the coordinates of a direction (e.g., the X-direction) in which the first movable body 110 is moved.

The first sensing yoke 171a and the second sensing yoke 171b may each output magnetic flux due to an eddy current. A magnitude of the eddy current and a magnitude of the magnetic flux may be dependent on each other.

The magnitude of the eddy current that may be formed in each of the first sensing yoke 171a and the second sensing yoke 171b may be dependent on a width of a portion facing the first sensing yoke 171a and the second sensing yoke 171b and the first sensing coil 172.

In an example, since the first sensing coil 172 may move in the first direction (for example, the X-direction) from the viewpoint of the first sensing yoke 171a and the second sensing yoke 171b, the magnitude of the eddy current that may be formed in each of the first sensing yoke 171a and the second sensing yoke 171b may be dependent on a relative movement of the first sensing coil 172 in the first direction (for example, the X-direction).

Since inductance of the first sensing coil 172 may be the sum or difference of mutual inductance due to the magnetic flux and self-inductance of the first sensing coil 172, the inductance of the first sensing coil 172 may vary depending on the magnitude of the magnetic flux due to the eddy current. The position of the first movable body 110 may be sensed based on the inductance of the first sensing coil 172.

As a change in the magnitude of the eddy current of each of the first sensing yoke 171a and the second sensing yoke 171b according to a movement displacement of the first movable body 110 becomes linear, the position of the first movable body 110 may be more precisely sensed.

Each of the first sensing yoke 171a and the second sensing yoke 171b may have a width that repeatedly increases or decreases along the direction in which the first movable body 110 is moved (e.g., the X-direction). The width refers to the width in the optical axis (the Z-axis) direction.

For example, the width of the first sensing yoke 171a may have a width that repeatedly decreases-increases-decreases-increases in the first direction (for example, the X-direction). The second sensing yoke 171b may have a width that repeatedly decreases-increases-decreases-increases-decreases in the first direction (for example, the X-direction).

The first sensing yoke 171a and the second sensing yoke 171b may each have a width that increases or decreases along one direction, and the first sensing yoke 171a and the second sensing yoke 171b may have a configuration in which positions where the widths increase and decrease are different.

The first sensing yoke 171a and the second sensing yoke 171b may each have a plurality of minimum widths and a plurality of maximum widths.

A boundary line that defines the width of each sensing yoke may have a sinusoidal wave shape.

A winding thickness of the first sensing coil 172 may be greater than a minimum width of each sensing yoke and less than the maximum width of each sensing yoke.

A position at which the first sensing yoke 171a has the minimum width is different from a position at which the second sensing yoke 171b has the minimum width. Additionally, a position at which the first sensing yoke 171a has the maximum width is different from a position at which the second sensing yoke 171b has the maximum width.

Accordingly, the coordinates in one direction (e.g., the X-direction) of the first movable body 110 corresponding to the maximum width (the maximum width in the optical axis (the Z-axis) direction) of the first sensing yoke 171a may be different from the coordinates in one direction (e.g., the X-direction) of the first movable body 110 corresponding to the maximum width (the maximum width in the optical axis (the Z-axis) direction) of the second sensing yoke 171b.

In an example, the X-direction coordinates of the first movable body 110 corresponding to a minimum width W1 of the first sensing yoke 171a and the X-direction coordinates corresponding to the minimum width of the second sensing yoke 171b may be different from each other, and the X-direction coordinates corresponding to a maximum width W2 of the first sensing yoke 171a and the X-direction coordinates corresponding to the maximum width of the second sensing yoke 171b may be different from each other.

Accordingly, an influence of a displacement in one direction of the first sensing yoke 171a in a pattern of the change in the magnitude of the eddy current of the first sensing yoke 171a according to a relative movement of the first sensing yoke 171a and an influence of a displacement in one direction of the second sensing yoke 171b in a pattern of the change in the magnitude of the eddy current of the second sensing yoke 171b according to a relative movement of the second sensing yoke 171b may be complementary to each other.

Therefore, the inductance of the first sensing coil 172 may be more stably changed according to the integration of the inductance change factor according to the change in the magnitude of the eddy current of the first sensing yoke 171a and the inductance change factor according to the change in the magnitude of the eddy current of the second sensing yoke 171b, and accordingly, the sensor shifting actuator 100 according to an example may more stably and/or accurately detect the movement of the first movable body 110 and more linearly and/or efficiently detect the movement of the first movable body 110.

A length of the first sensing yoke 171a in the first direction (for example, the X-direction) may be one period or more of a period of the width of the first sensing yoke 171a, and a length of the second sensing yoke 171b in the first direction (for example, the X-direction) may be one period of more of a period of the width of the second sensing yoke 171b.

The width of each of the first sensing yoke 171a and the second sensing yoke 171b may be repeated every 1 cycle. The first direction (for example, the X-direction) length of the width of each of the first sensing yoke 171a and the second sensing yoke 171b may vary depending on a movement sensing range of the first movable body 110.

Due to a difference between one direction (e.g., the X-direction) coordinates of the first movable body 110 corresponding to the maximum width of the first sensing yoke 171a and one direction (e.g., the X-direction) coordinates of the first movable body 110 corresponding to the maximum width of the second sensing yoke 171b, an output value of the first sensing coil 172 according to the movement of each sensing yoke may be a sine wave having a phase difference of 90 degrees.

Accordingly, an output value obtained by performing arctangent processing on the output of the sine wave having a phase difference of 90 degrees may be linear with respect to the movement of the first movable body 110.

Each of the first sensing yoke 171a and the second sensing yoke 171b may include at least one of copper, silver, gold, and aluminum, as examples. Since copper, silver, gold, and aluminum have relatively high conductivity, the overall magnitude of the eddy current formed in the first sensing yoke 171a and the second sensing yoke 171b according to the magnetic flux of the first sensing coil 172 may increase, and the movement detection sensitivity of the first movable body 110 may be further improved.

In one or more examples, the first sensing coil 172 may be configured as a plurality of sensing coils to which an inductance change factor according to a change in the magnitude of the eddy current of the first sensing yoke 171a and an inductance change factor according to a change in the magnitude of the eddy current of the second sensing yoke 171b are applied, respectively. In this example, the first sensing yoke 171a and the second sensing yoke 171b may be disposed to face different sensing coils.

Since the inductance of each of the plurality of sensing coils is used together to generate information on the movement of the first movable body 110, the inductance change factor according to the change in the magnitude of the eddy current of the first sensing yoke 171a and the inductance change change factor according to the change in the magnitude of the eddy current of the second sensing yoke 171b may be integrally used, and the sensor shifting actuator 100 according to an example may more linearly detect the movement of the first movable body 110.

Figure 9A:
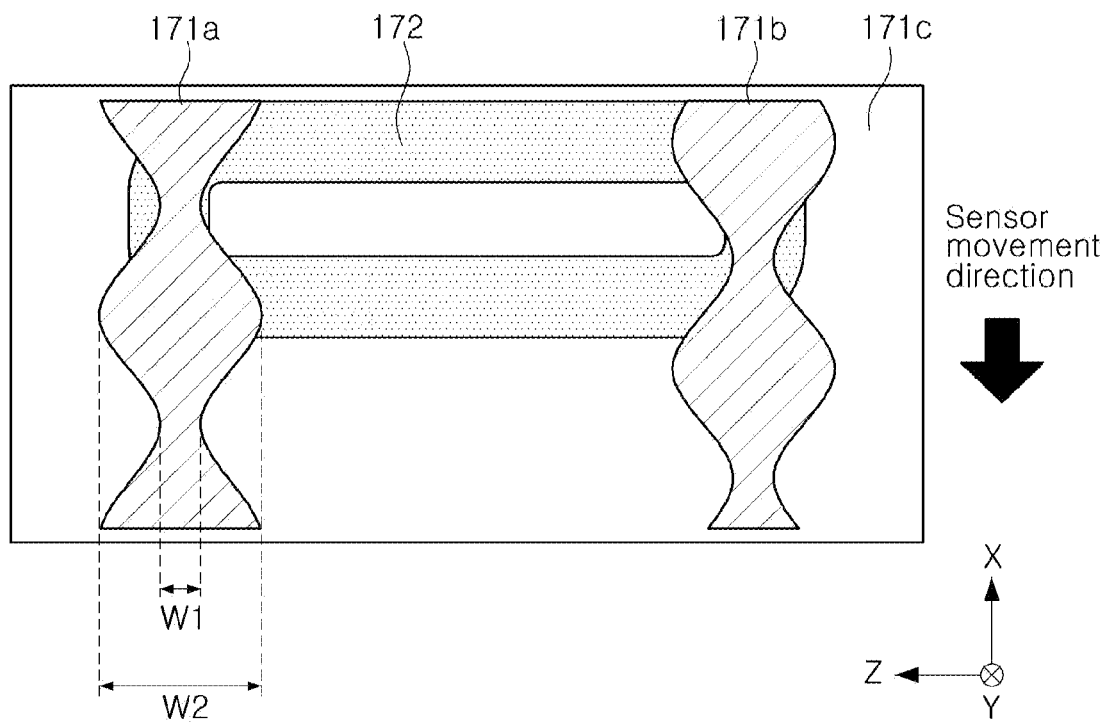
FIG. 9A and FIG. 9B are diagrams illustrating a change in a positional relationship between a first sensing yoke and a first sensing coil according to a movement of a first movable body in a position sensor, in accordance with one or more embodiments.
Figure 9B:
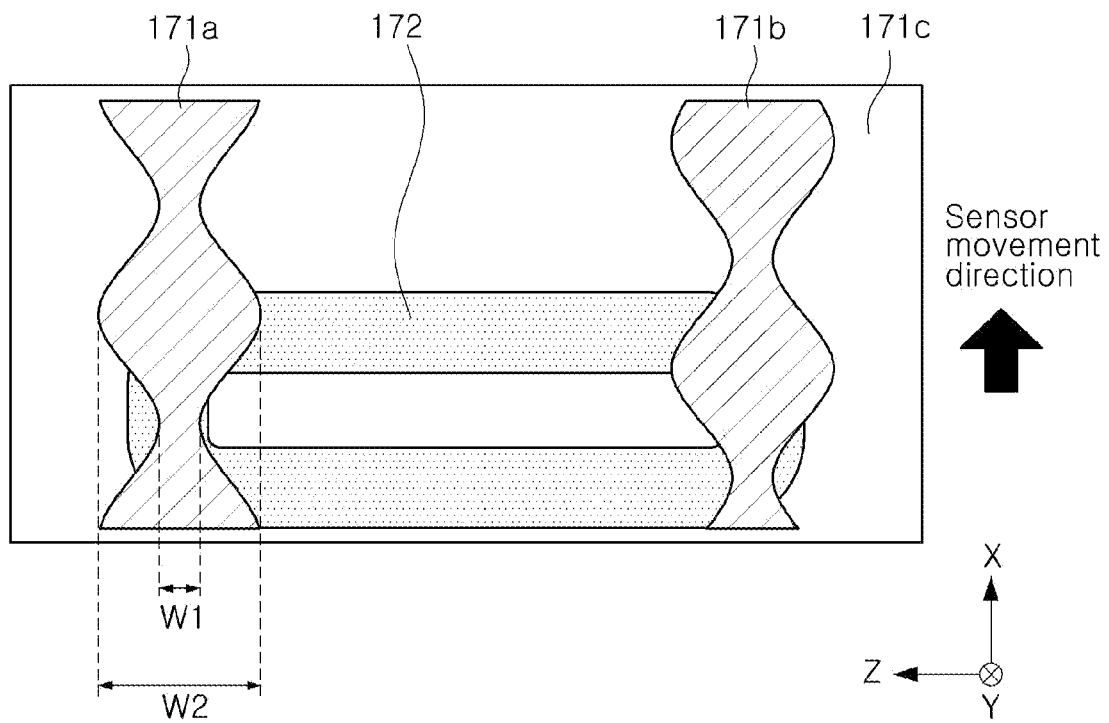

FIGS. 9A and 9B are diagrams illustrating a change in the positional relationship between the first sensing yoke unit and the first sensing coil according to a movement of the first movable body in the position sensing unit, in accordance with one or more embodiments.

Referring to FIGS. 9A and 9B, since the width of the first sensing yoke unit 171 changes along the moving direction of the first movable body 110, a region in which the first sensing yoke unit 171 and the first sensing coil 172 overlap in the second direction (for example, the Y-direction) changes according to a movement of the first movable body 110.

Widths of portions of the first sensing yoke 171a and the second sensing yoke 171b overlapping the first sensing coil 172 in the second direction (for example, the Y-direction) may vary according to the movement of the first sensing yoke 171a and the second sensing yoke 171b in the first direction (for example, the X-direction). Accordingly, the inductance of the first sensing coil 172 may vary according to the movement of the first movable body 110 in the first direction (for example, the X-direction), and the movement of the first movable body 110 in the first direction (for example, the X-direction) may be sensed.

Figure 10:
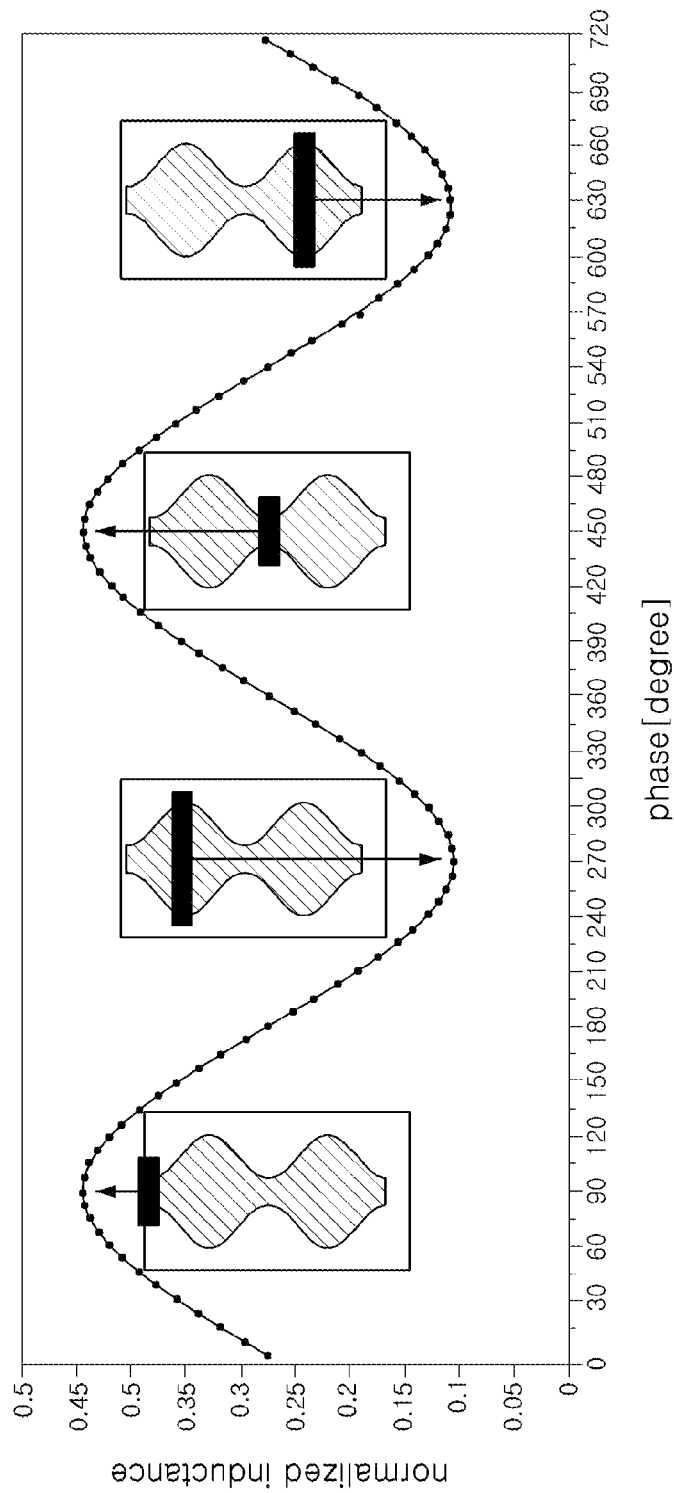
FIG. 10 is a graph illustrating inductance of a first sensing coil according to movement of a first movable body in one direction.

FIG. 10 is a graph illustrating inductance of a first sensing coil according to a movement of the first movable body in one direction.

Referring to FIG. 10, a period of a width of the first sensing yoke 171a may correspond to a phase of 360 degrees.

When a specific region (e.g., the center of the first sensing coil 172) of the first sensing coil 172 and a minimum width of the first sensing yoke 171a overlap, normalized inductance of the first sensing coil 172 may have a maximum value.

When a specific region (e.g., the center of the first sensing coil 172) of the first sensing coil 172 and a maximum width of the first sensing yoke 171a overlap, normalized inductance of the first sensing coil 172 has a minimum value.

In an example, the normalization may be a value obtained by applying a specific weight to the inductance.

Figure 11A:
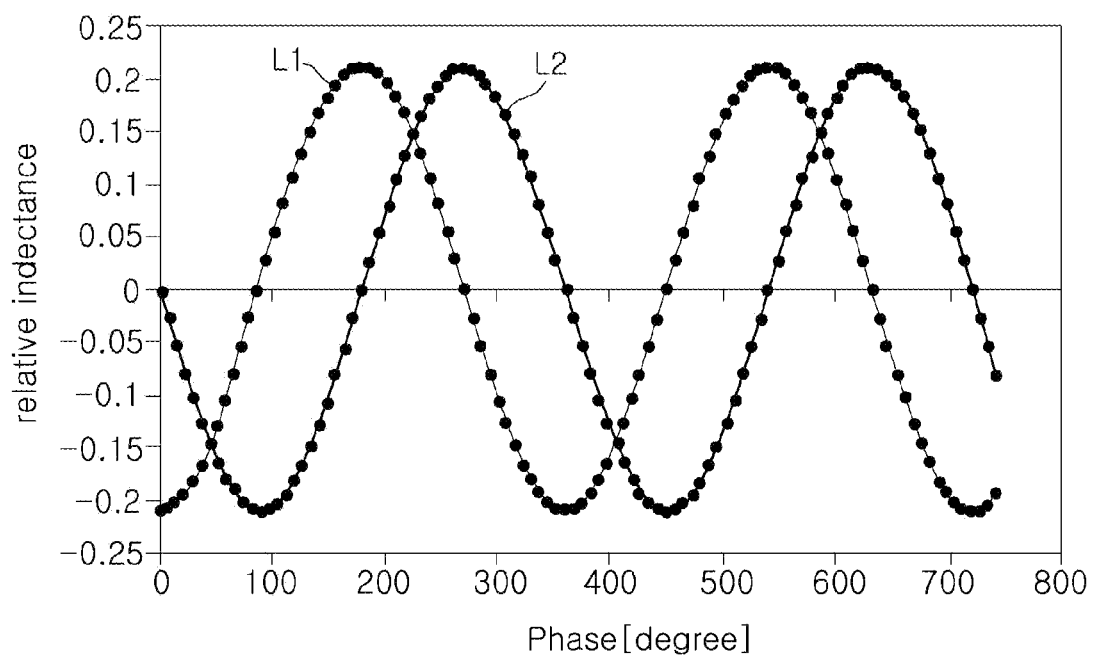
FIG. 11A is a graph illustrating a plurality of inductances of a first sensing coil respectively corresponding to a first sensing yoke and a second sensing yoke of a sensor shifting actuator, in accordance with one or more embodiments.

FIG. 11A is a graph illustrating a plurality of inductances of a first sensing coil corresponding to each of a first sensing yoke and a second sensing yoke of a sensor shifting actuator, in accordance with one or more embodiments.

Referring to FIG. 11A, a phase difference between the first inductance L1 of the first sensing coil 172 corresponding to the first sensing yoke 171a and the second inductance L2 of the first sensing coil 172 corresponding to the second sensing yoke 171b may be 90 degrees. In an example, the inductance may be a value obtained by subtracting a specific value so that an average value is 0 from the normalized inductance.

Figure 11B:
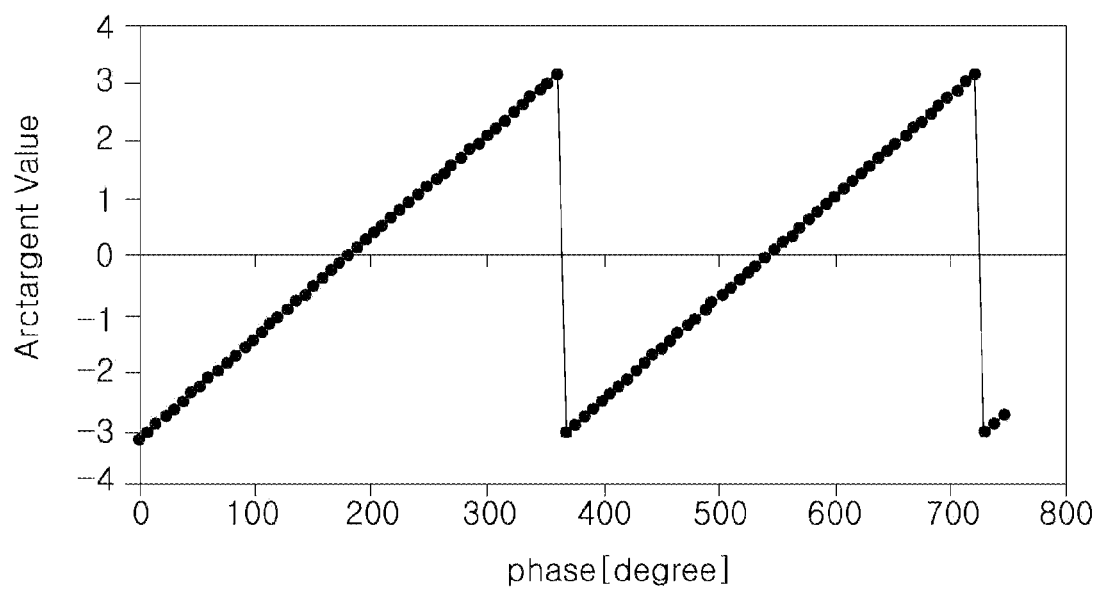
FIG. 11B is a graph illustrating arctangent processing values of a plurality of inductances shown in FIG. 11A.

FIG. 11B is a graph illustrating arctangent processing values of a plurality of inductances shown in FIG. 11A.

Referring to FIG. 11B, an arctangent treatment value may change linearly over a change in phase.

When the first inductance L1 and the second inductance L2 have a phase difference of 90 degrees from each other, one of the first inductance L1 and the second inductance L2 may correspond to {sin(phase)} and the other may correspond to {cos(phase)}.

In a trigonometric model, an angle directing one point of a circle from the origin may correspond to a phase of one period of the sensing yoke, a distance from the origin to one point of the circle is r, and an X-direction vector value and a Y-direction vector value from the origin to one point of the circle may be X and Y, respectively.

{sin(phase)} is (y/r), {cos(phase)} is (x/r). {tan(phase)} is (y/x), {sin(phase)}/{cos(phase)}, and (second inductance)/(first inductance).

Accordingly, arctan{(second inductance)/(first inductance)} may correspond to a phase of one period of a displacement identification layer, and may be an arctan processing value.

Figure 12:
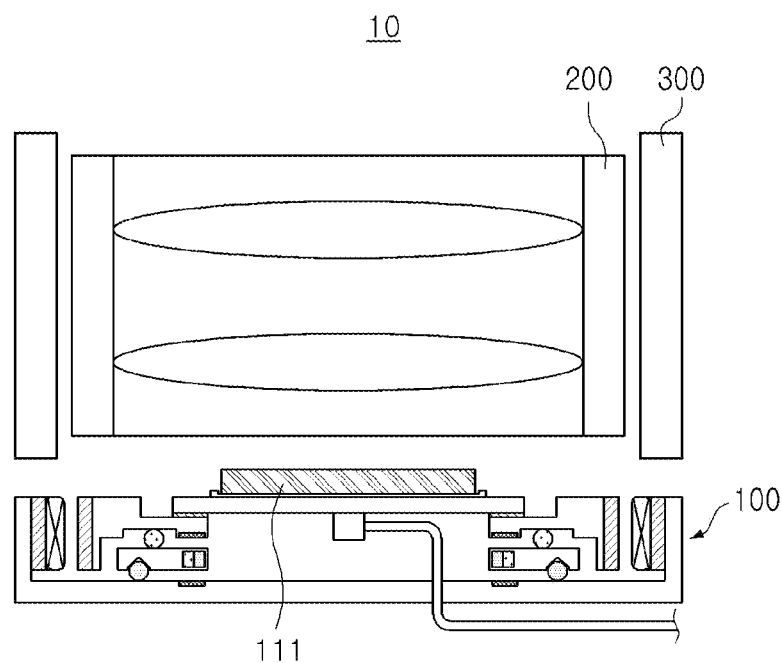
FIG. 12 is a schematic cross-sectional view of an example camera module, in accordance with one or more embodiments.

FIG. 12 is a schematic cross-sectional view of an example camera module, in accordance with one or more embodiments.

Referring to FIG. 12, a camera module 10, in accordance with one or more embodiments, includes a lens module 200, a housing 300 that accommodates the lens module 200, and a sensor shifting actuator 100.

At least one lens to image a subject may be accommodated in the lens module 200. When a plurality of lenses are arranged in the lens module 200, the plurality of lenses may be mounted inside the lens module 200 along the optical axis (the Z-axis).

The lens module 200 may have a hollow cylindrical shape.

In an example, the lens module 200 may include a lens barrel and a lens holder. In this example, at least one lens may be accommodated in the lens barrel, and the lens barrel may be coupled to the lens holder.

The housing 300 accommodates the lens module 200, and the housing 300 is coupled to the sensor shifting actuator 100.

The sensor shifting actuator 100 may be the sensor shifting actuator 100 according to an example described above.

An image sensor 111 may be disposed in the sensor shifting actuator 100, and the image sensor 111 may be moved in the first direction (for example, the X-direction) and the second direction (for example, the Y-direction) by the driving unit 120.

Accordingly, a shake correction function (that is, an optical image stabilization) may be performed by the movement of the image sensor 111.

The camera module 10, in accordance with one or more embodiments, may perform shake correction by moving the image sensor 111, instead of the lens module 200. Since the relatively light image sensor 111 is moved, the image sensor 111 may be moved with a smaller driving force. Accordingly, a form factor of the camera module may be miniaturized.

Figure 13:
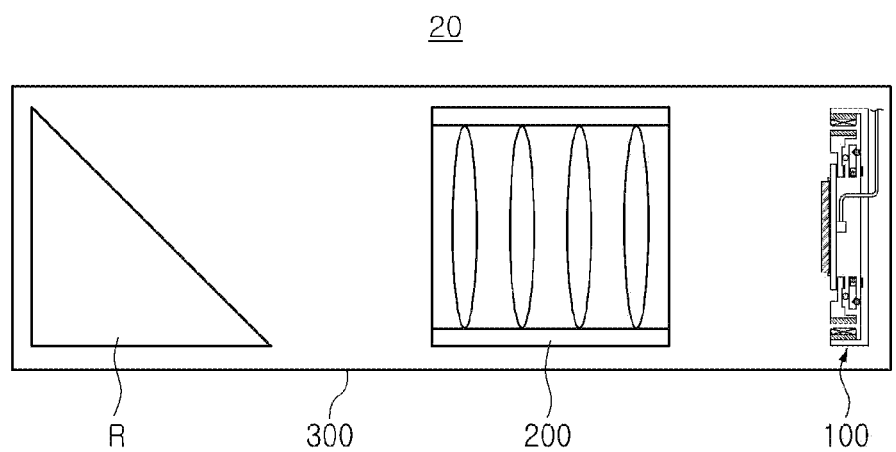
FIG. 13 is a schematic cross-sectional view of an example camera module, in accordance with one or more embodiments.

FIG. 13 is a schematic cross-sectional view of a camera module, in accordance with one or more embodiments.

Referring to FIG. 13, a camera module 20, in accordance with one or more embodiments, includes a housing 300, a reflective member R, a lens module 200, and a sensor shifting actuator 100.

In an example, the optical axis (the Z-axis) of the lens module 200 may face in a direction orthogonal to a thickness direction (direction facing a rear surface from a front surface of the portable electronic device or the opposite direction) of a portable electronic device.

For example, the optical axis (the Z-axis) of the lens module 200 may be formed in a width direction or a length direction of the portable electronic device.

If the components constituting the camera module are laminated along the thickness direction of the portable electronic device, the thickness of the portable electronic device may increase.

However, in the example camera module, since the optical axis (the Z-axis) of the lens module 200 is formed in the width direction or the length direction of the portable electronic device, the thickness of the portable electronic device may be reduced.

A reflective member R and a lens module 200 are disposed inside the housing 300. However, this is only an example, and the reflective member R and the lens module 200 may be disposed in separate housings, and the respective housings may be coupled to each other.

The reflective member R is configured to change a traveling direction of light. For example, a traveling direction of light incident into the housing 300 may be changed toward the lens module 200 by the reflective member R. The reflective member R may be a mirror or a prism that reflects light.

The sensor shifting actuator 100 is coupled to the housing 300.

The sensor shifting actuator 100 may be the sensor shifting actuator 100 in accordance with one or more embodiments described above.

The image sensor 111 may be disposed on the sensor shifting actuator 100, and the image sensor 111 may be moved in the first direction (for example, the X-direction) and the second direction (for example, the Y-direction).

Since the image sensor 111 may be moved in the first direction (for example, the X-direction) and the second direction (for example, the Y-direction), a shake correction function (optical image stabilization) may be performed by the movement of the image sensor 111.

As set forth above, the example sensor shifting actuator may improve shake correction performance.

While this disclosure includes specific examples, it will be apparent to one of ordinary skill in the art, after an understanding of the disclosure of this application, that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A sensor shifting actuator, comprising:
   a first movable body in which an image sensor having an imaging surface is disposed;
   a fixed body in which the first movable body is disposed to be movable in a first direction parallel to the imaging surface and a second direction parallel to the imaging surface;
   a driving unit configured to provide a driving force to the first movable body; and
   a position sensing unit configured to sense a position of the first movable body, and comprising a sensing coil, disposed on any one of the first movable body and the fixed body, and a sensing yoke unit disposed on the other of the first movable body and the fixed body,
   wherein the sensing yoke unit comprises a plurality of sensing yokes spaced apart from each other in a direction orthogonal to the imaging surface, and each sensing yoke is configured to change in width in a moving direction of the first movable body.

2. The sensor shifting actuator of claim 1, wherein:
   each of the plurality of sensing yokes comprise a first sensing yoke and a second sensing yoke, and
   the first sensing yoke and the second sensing yoke each face the sensing coil in a direction parallel to the imaging surface.

3. The sensor shifting actuator of claim 2, wherein the first sensing yoke and the second sensing yoke each have a width that increases and decreases in a moving direction of the first movable body, and the first sensing yoke and the second sensing yoke have different positions at which the width is increased or decreased.

4. The sensor shifting actuator of claim 3, wherein:
   the first sensing yoke and the second sensing yoke each have a plurality of minimum widths and a plurality of maximum widths,
   a position at which the first sensing yoke has a minimum width is different from a position at which the second sensing yoke has a minimum width, and
   a position at which the first sensing yoke has a maximum width is different from a position at which the second sensing yoke has a maximum width.

5. The sensor shifting actuator of claim 4, wherein a winding thickness of the sensing coil is greater than the minimum width of each sensing yoke, and is less than the maximum width of each sensing yoke.

6. The sensor shifting actuator of claim 1, wherein a boundary line defining the width of each sensing yoke of the plurality of sensing yokes has a sinusoidal wave shape.

7. The sensor shifting actuator of claim 2, wherein a direction of a current flowing through a portion of the sensing coil facing the first sensing yoke is different from a direction of a current flowing through a portion of the sensing coil facing the second sensing yoke.

8. The sensor shifting actuator of claim 2, wherein a distance between the first sensing yoke and the second sensing yoke in a direction orthogonal to the imaging surface is less than a distance between both ends of the sensing coil in a direction orthogonal to the imaging surface.

9. The sensor shifting actuator of claim 1, wherein:
   the position sensing unit comprises a first position sensor configured to sense a position of the first movable body in the first direction and a second position sensor sensing configured to sense a position of the first movable body in the second direction,
   wherein the first direction and the second direction are orthogonal to each other.

10. The sensor shifting actuator of claim 9, wherein:
    the first position sensor comprises a first sensing coil disposed on the fixed body and a first sensing yoke unit disposed on the first movable body,
    the first sensing coil and the first sensing yoke unit face each other in the second direction,
    the first sensing yoke unit comprises a first sensing yoke and a second sensing yoke spaced apart from each other in a direction orthogonal to the imaging surface,
    the second position sensor comprises a second sensing coil disposed on the fixed body and a second sensing yoke unit disposed on the first movable body, the second sensing coil and the second sensing yoke unit face each other in the first direction, and the second sensing yoke unit comprises a third sensing yoke and a fourth sensing yoke spaced apart from each other in a direction orthogonal to the imaging surface.

11. The sensor shifting actuator of claim 1, further comprising:

a second movable body disposed between the first movable body and the fixed body, wherein the first movable body is movable in the first direction together with the second movable body, and wherein the first movable body is movable in the second direction relative to the second movable body.

12. The sensor shifting actuator of claim 11, further comprising:

a first ball member disposed between the second movable body and the fixed body; and a second ball member disposed between the first movable body and the second movable body, wherein the first ball member is disposed to be rollable in the first direction, and the second ball member is disposed to be rollable in the second direction.

13. The sensor shifting actuator of claim 12, wherein:

a first magnetic member is disposed on the second movable body, a second magnetic member is disposed in a position facing the first magnetic member on each of the first movable body and the fixed body, and an attractive force acts between the first magnetic member and the second magnetic member.

14. The sensor shifting actuator of claim 1, wherein:

the driving unit comprises a coil unit disposed on any one of the first movable body and the fixed body and a movable yoke unit disposed on the other of the first movable body and the fixed body, and wherein the movable yoke unit is formed of a soft magnetic material the is magnetized by a magnetic field of the coil unit.

15. The sensor shifting actuator of claim 14, wherein:

the coil unit comprises a first coil, a second coil, a third coil, and a fourth coil disposed on the fixed body, the movable yoke unit comprises a first movable yoke, a second movable yoke, a third movable yoke, and a fourth movable yoke disposed on the first movable body, the first coil and the second coil are spaced apart from each other in the first direction, the third coil and the fourth coil are spaced apart from each other in the second direction, and the first movable yoke to the fourth movable yoke are arranged to face the first coil to the fourth coil, respectively.

16. The sensor shifting actuator of claim 14, wherein the movable yoke unit is magnetized when power is supplied to the coil unit, and the movable yoke unit loses magnetism when power supplied to the coil unit is cut off.

17. An apparatus, comprising:

a camera module comprising:

a fixed body;

a first movable body configured to move an image sensor in a first direction orthogonal to an optical axis and a second direction orthogonal to the optical axis;

a second movable body, disposed between the first movable body and the fixed body; and position sensing units, configured to detect a position of the first movable body in the first direction and the second direction;

wherein each of the position sensing units comprises a sensing coil and a sensing yoke unit, wherein the sensing yoke unit comprises a first sensing yoke and a second sensing yoke spaced apart from each other, and wherein each of the first sensing yoke and the second sensing yoke is configured to have a width that continually increases and decreases along a direction in which the first movable body moves.

18. The apparatus of claim 17, wherein, a position where the first sensing yoke has a maximum width is different from a position where the second sensing yoke has a maximum width.

19. The apparatus of claim 17, wherein a boundary line that defines the width of the first sensing yoke and the width of the second sensing yoke is configured to have a sinusoidal shape.

* * * * *